US012676822B2

(12) United States Patent
Hibi et al.

(10) Patent No.: US 12,676,822 B2
(45) Date of Patent: Jul. 7, 2026

(54) COMMUNICATION SYSTEM, INTERMEDIATE DEVICE, COMMUNICATION METHOD, AND PROGRAM

(71) Applicant: NTT, Inc., Tokyo (JP)

(72) Inventors: Tomoya Hibi, Musashino (JP); Junki Ichikawa, Musashino (JP); Toru Mano, Musashino (JP); Kazuya Anazawa, Musashino (JP); Yukio Tsukishima, Musashino (JP); Kenji Shimizu, Musashino (JP); Hideki Nishizawa, Musashino (JP); Koichi Takasugi, Musashino (JP)

(73) Assignee: NTT, Inc., Tokyo (JP)

( * ) Notice: Subject to any disclaimer, the term of this patent is extended or adjusted under 35 U.S.C. 154(b) by 319 days.

(21) Appl. No.: 18/697,928

(22) PCT Filed: Oct. 8, 2021

(86) PCT No.: PCT/JP2021/037380
§ 371 (c)(1),
(2) Date: Apr. 2, 2024

(87) PCT Pub. No.: WO2023/058232
PCT Pub. Date: Apr. 13, 2023

(65) Prior Publication Data
US 2024/0414092 A1 Dec. 12, 2024

(51) Int. Cl.
*H04L 47/30* (2022.01)
*H04L 49/9005* (2022.01)

(52) U.S. Cl.
CPC .......... *H04L 47/30* (2013.01); *H04L 49/9005* (2013.01)

(58) Field of Classification Search
CPC .... H04L 47/30; H04L 49/9005; H04L 47/283
See application file for complete search history.

(56) References Cited

U.S. PATENT DOCUMENTS 6,052,726 A * 4/2000 Fontenot ............... H04L 47/283
709/224
8,964,581 B2 2/2015 Takara et al.
(Continued)

FOREIGN PATENT DOCUMENTS

JP 2006287293 10/2006
JP 2014057170 3/2014
WO WO 2020/031514 2/2020

*Primary Examiner* — Tejis Daya
(74) *Attorney, Agent, or Firm* — Fish & Richardson P.C.

(57) ABSTRACT

A communication system includes a first intermediate device 10A and a second intermediate device 10B, in which the first intermediate device includes a buffer management unit 15 that determines a buffer size based on delay information and secures a buffer, a transfer unit 11 that, when data to be transferred to a second device 50 is smaller than a credit of the second intermediate device, transfers a request including the data to the second intermediate device, and a generation unit 12A that generates a pseudo-response to the request and returns the pseudo-response to the first device, and the second intermediate device includes a buffer management unit 15 that determines a buffer size based on the delay information and secures a buffer, a transfer unit 11 that transfers the request to the second device and stores the request in the buffer to update the credit of its own device, and a discarding unit 12B that discards a response received from the second device, deletes the request stored in the buffer, and updates the credit.

7 Claims, 20 Drawing Sheets

(56)     References Cited

U.S. PATENT DOCUMENTS

| | | | |
|---|---|---|---|
| 2003/0223444 A1* | 12/2003 | Lambrecht | H04L 47/50 |
| | | | 370/229 |
| 2007/0036180 A1* | 2/2007 | Shenoi | H04J 3/0632 |
| | | | 370/235 |
| 2014/0071994 A1 | 3/2014 | Sazawa et al. | |
| 2020/0089649 A1 | 3/2020 | Pandya et al. | |
| 2021/0314067 A1 | 10/2021 | Inui et al. | |
| 2024/0394215 A1* | 11/2024 | Ichikawa | G06F 15/17331 |

* cited by examiner

COMMUNICATION SYSTEM, INTERMEDIATE DEVICE, COMMUNICATION METHOD, AND PROGRAM

CROSS-REFERENCE TO RELATED APPLICATIONS

This application is a National Stage application under 35 U.S.C. § 371 of International Application No. PCT/JP2021/037380, having an International Filing Date of Oct. 8, 2021. The disclosure of the prior application is considered part of the disclosure of this application, and is incorporated by reference in its entirety into this application.

TECHNICAL FIELD

The present invention relates to a communication system, an intermediate device, a communication method, and a program.

BACKGROUND ART

With the progress of communication technologies, provision of a new network for connection in a wide band and a long distance has been studied. A system has been studied in which devices such as transponders mounted in an optical transmission system are mounted in a client system such as a server in a new network. In such a system, an electric signal is delivered to a server or the like of a communication partner without being subjected to electro-optical conversion in the middle of transmission.

A technology for an optical transmission system for establishing a high-speed transmission line with a small number of network resources (such as frequencies) by selecting an optimal communication mode (modulation scheme, baud rate, the number of carriers, etc.) from a network state (distance, signal quality, etc.) has been proposed (refer to PTL 1 and PTL 2). With such a technique, long-distance and high-speed communication between communication apparatuses can be realized with a small amount of network resources.

CITATION LIST

Patent Literature

[PTL 1] U.S. Pat. No. 8,964,581
[PTL 2] WO 2020/031514

SUMMARY OF INVENTION

Technical Problem

Remote Direct Memory Access (RDMA) used in the transport layer of InfiniBand is a communication protocol for performing high-speed and high-reliability data transfer between communication terminals located at a distance. Since RDMA enables direct memory access from the memory area of a transmitter to the memory area of a receiver, high-speed communication is possible.

However, in RDMA, there is a problem that the transfer performance deteriorates as the network covers a longer distance. This is because a longer transfer time is required on an extended line, and the next packet cannot be transmitted until a packet indicating completion of data transfer is received in the connection type protocol.

The present invention has been made in view of the above-mentioned circumstances, and aims to realize high-speed and high-reliability data transfer even if a transfer destination of RDMA is at a long distance.

Solution to Problem

In order to achieve the above object, an aspect of the present invention relates to a communication system including a first intermediate device and a second intermediate device, in which the first intermediate device and the second intermediate device are arranged between a first device and a second device for transferring data using Remote Direct Memory Access, the first intermediate device includes a buffer management unit that determines a buffer size based on delay information about a delay of a network between the first intermediate device and the second intermediate device, and secures a buffer in the buffer size, a transfer unit that, when data to be transferred from the first device to the second device is smaller than a credit of the second intermediate device, transfers a request including the data to the second intermediate device, and a generation unit that generates a pseudo-response to the request and return the pseudo-response to the first device e, and the second intermediate device includes a buffer management unit that determines a buffer size based on the delay information and secures a buffer in the buffer size, a transfer unit that transfers the request to the second device and stores the request in the buffer to update the credit of the own device, and a discarding unit that discards a response received from the second device with respect to the request, deletes the request stored in the buffer, and updates the credit.

An aspect of the present invention is an intermediate device arranged between a first device and a second device for transferring data using Remote Direct Memory Access, the intermediate device including a buffer management unit that determines a buffer size based on delay information about a network between the intermediate device and another intermediate device as a transfer destination, and secures a buffer in the buffer size, a transfer unit that, when data to be transferred from the first device to the second device is smaller than a credit of the intermediate device as the transfer destination, transfers a request including the data to the intermediate device as the transfer destination, and a generation unit that generates a pseudo-response to the request and returns the pseudo-response to the first device.

An aspect of the present invention relates to a communication method performed by a communication system including a first intermediate device and a second intermediate device, in which the first intermediate device and the second intermediate device are arranged between a first device and a second device for transferring data using Remote Direct Memory Access, the first intermediate device performs determining of a buffer size based on delay information about a delay of a network between the first intermediate device and the second intermediate device, and securing of a buffer in the buffer size, when data to be transferred from the first device to the second device is smaller than a credit of the second intermediate device, transferring of a request including the data to the second intermediate device, and generating of a pseudo-response to the request and returning the pseudo-response to the first device, and the second intermediate device performs determining of a buffer size based on the delay information and securing of a buffer in the buffer size, transferring of the request to the second device and storing of the request in the buffer to update the credit of the own device, and discarding of a response received from the second device with respect to the request, deleting the request stored in the buffer, and updating of the credit.

An aspect of the present invention is a program which causes a computer to function as the intermediate device.

Advantageous Effects of Invention

According to the present invention, high-speed and high-reliability data transfer can be realized even if a transfer destination of RDMA is at a long distance.

DESCRIPTION OF EMBODIMENTS

Embodiments of the present invention will be described below with reference to the drawings.

1. Regarding RDMA

RDMA is a communication protocol for directly performing memory access from the memory area of a transmitter to the memory area of a receiver. Since RDMA has a credit-based flow control function and performs completion control for confirming the completion of data transfer to carry out processing, highly reliable communication is possible. RDMA is also used as a transport scheme for host-to-device and device-to-device data communication between a solid state drive (SSD) and a graphics processing unit (GPU).

Figure 1:
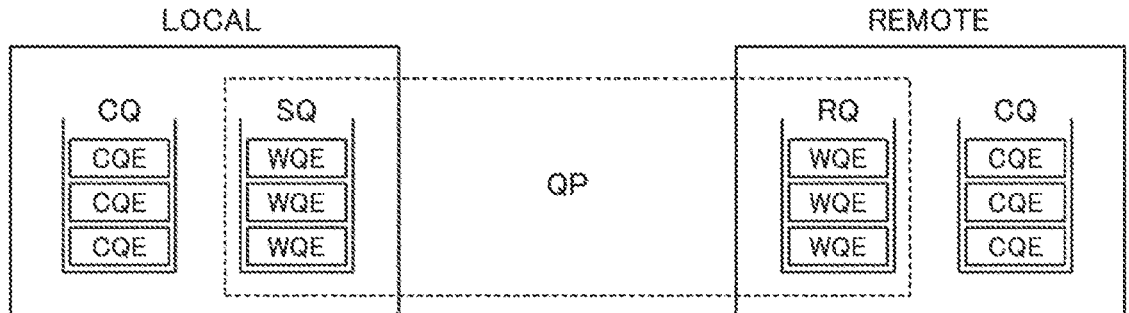
FIG. 1 is a diagram for explaining a communication model of RDMA.

As illustrated in FIG. 1, RDMA is a communication model in which a queue pair (QP) is formed between a local device and a remote device and data is transferred using the QP. A QP is a set of a Send Queue (SQ) and a Receive Queue (RQ). A communication unit of RDMA is a communication request called a Work Request (WR), and is stacked in SQ/RQ in units of Work Queue Elements (WQE). A WR includes a Send WR which is a transmission request and a Receive WR which is a reception request.

In a Send WR, the memory area of data to be transmitted is designated as a WQE and is stacked in the SQ. In a Receive WR, the memory area for receiving data is designated as a WQE and is stacked in the RQ. WQEs can be stacked in the SQ/RQ in the queue size of the SQ/RQ in the first-in-first-out (FIFO) manner. When processing of the WQEs is normally completed in the QP, Completion Queue Entries (CQEs) indicating normal completion are stacked in a Completion Queue (CQ) corresponding to each of the SQ/RQ. When the processing of WQEs is finished in the QP due to an error, a CQE indicating an error is stacked in the CQ. When the WQEs are normally completed, the WQEs in the SQ/RQ are deleted, which enables the next WQE to be accepted.

Service types of RDMA are roughly divided into 4 types including Reliable Connection (RC), Reliable Datagram (RD), Unreliable Connection (UC), and Unreliable Datagram (UD) according to the categories of Reliable or Unreliable and Connection or Datagram. RC and UD are generally used.

RC guarantees the sequence and reachability of messages by a mechanism for confirmation of the success/failure of communication with ACK/NAK, and retransmission. In addition, RC is a connection type and for performing one-to-one communication in a QP between local and remote devices.

Although UD has no mechanism of acknowledgment or retransmission, it makes it possible to perform multi-to-multi-way communication such as transmission to a plurality of QPs and reception from a plurality of QPs by designating a destination for each communication.

Operation types in RDMA are broadly classified into four operation types, including SEND, RDMA WRITE (WITH Immediate), RDMA READ, and ATOMIC operations. All of the operation types can be used in RC. In UD, only SEND can be used.

Retransmission control in RDMA is classified into three patterns, that is, a case where no ACK/NAK is returned, a case where a Receiver-Not-Ready (RNR) NAK is returned, and a case where an Out-Of-Sequence NAK is returned. In a case where an ACK or an NAK is not returned from the remote side within a fixed time, the local side retransmits the ACK or NAK as time-out. In addition, when no WQE can be prepared in a RQ, the remote side returns a RNR NAK. When the RNR NAK is returned from the remote side, the local side retransmits the RNR NAK after a fixed time. In addition, the remote side returns an Out-Of-Sequence NAK when the Packet Sequence Number (PSN) of the received packet is not in order. When the Out-Of-Sequence NAK is returned from the remote side, the local side retransmits the Out-Of-Sequence NAK without waiting.

Next, an operation of the service type RC will be described. Here a case of SEND will be described below as an example.

Figure 2:
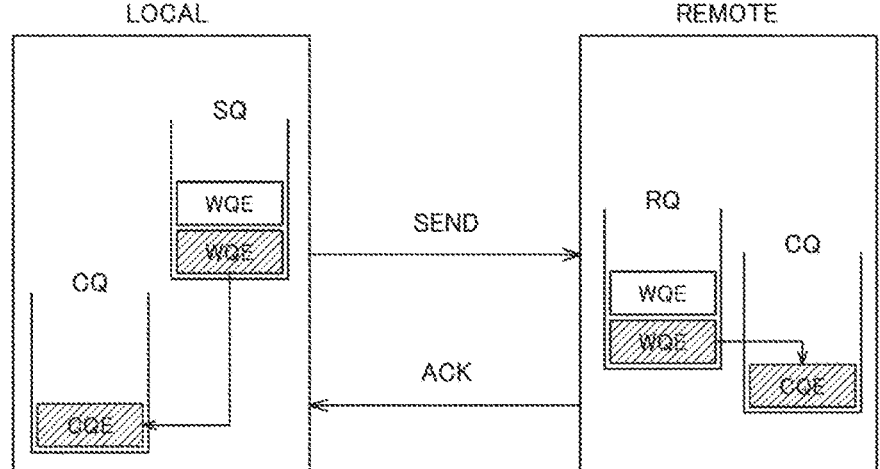
FIG. 2 is a diagram for explaining SEND of RDMA.

FIG. 2 is a diagram for explaining SEND of RDMA. SEND is a basic transmission and reception model of RDMA for transmission of data from a local side to a remote side.

The local side prepares an SQ, the remote side prepares an RQ, and the local side and the remote side stack WQE in the SQ and the RQ, respectively.

When the communication is ready, the local side transmits data in SEND. When the remote side succeeds in reception of the data, the remote side stacks a CQE in the CQ, releases a WQE of the RQ, and returns an ACK to the local side. Upon receiving the ACK, the local side stacks a CQE in the CQ and releases a WQE of the SQ.

Furthermore, in SEND, a SEND w/Imm (SEND with Immediate) which is a special operation is prepared. In SEND w/Imm, a special field (imm_data) can be set in a WQE of the SQ of the local side, and imm_data can be transmitted simultaneously when data is transmitted from the local side to the remote side. The remote side stacks a CQE including imm_data in the CQ when reception of the data is successful. The remote side can ascertain the content of imm_data by referring to the CQE.

2. First Embodiment

<Configuration of Communication System>

Figure 3:
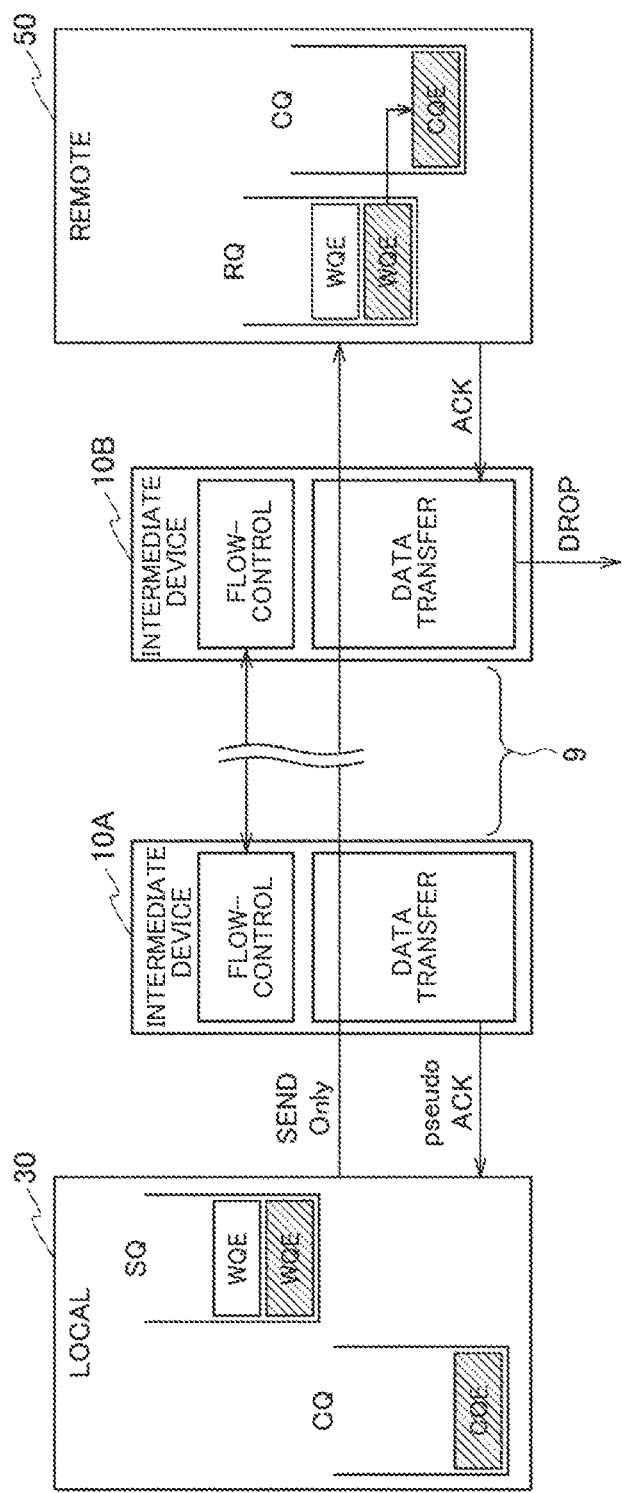
FIG. 3 is a diagram illustrating an example of a configuration of a communication system of a first embodiment.

Next, an example of a configuration of a communication system including intermediate devices 10A and 10B according to the present embodiment will be described with reference to FIG. 3.

The intermediate devices 10A and 10B are arranged between a local 30 (local device) and a remote 50 (remote device) for transferring data by using RDMA. More specifically, the intermediate device 10A is arranged before a network 9 for a long distance (network) on the local 30 side, and the intermediate device 10B is arranged before the network 9 on the remote 50 side.

As a data transfer function, the intermediate device 10A receives a request (SEND or the like) from the local 30 and returns a pseudo-response to the local 30 in response to the request. The intermediate device 10B transfers the request transmitted from the intermediate device 10A to the remote 50 and discards a response (ACK or the like) from the remote 50. As a flow control function, the intermediate devices 10A and 10B perform credit-based flow control and periodically transmit the credit (free buffer capacity) of the own device to the partner device at a prescribed timing.

The communication system may include the local 30 and the remote 50 for transferring data using RDMA in addition to the intermediate devices 10A and 10B. The local 30 (a first device) is a device as a data transfer source. The remote 50 (a second device) is a device as a data transfer destination.

Figure 4:
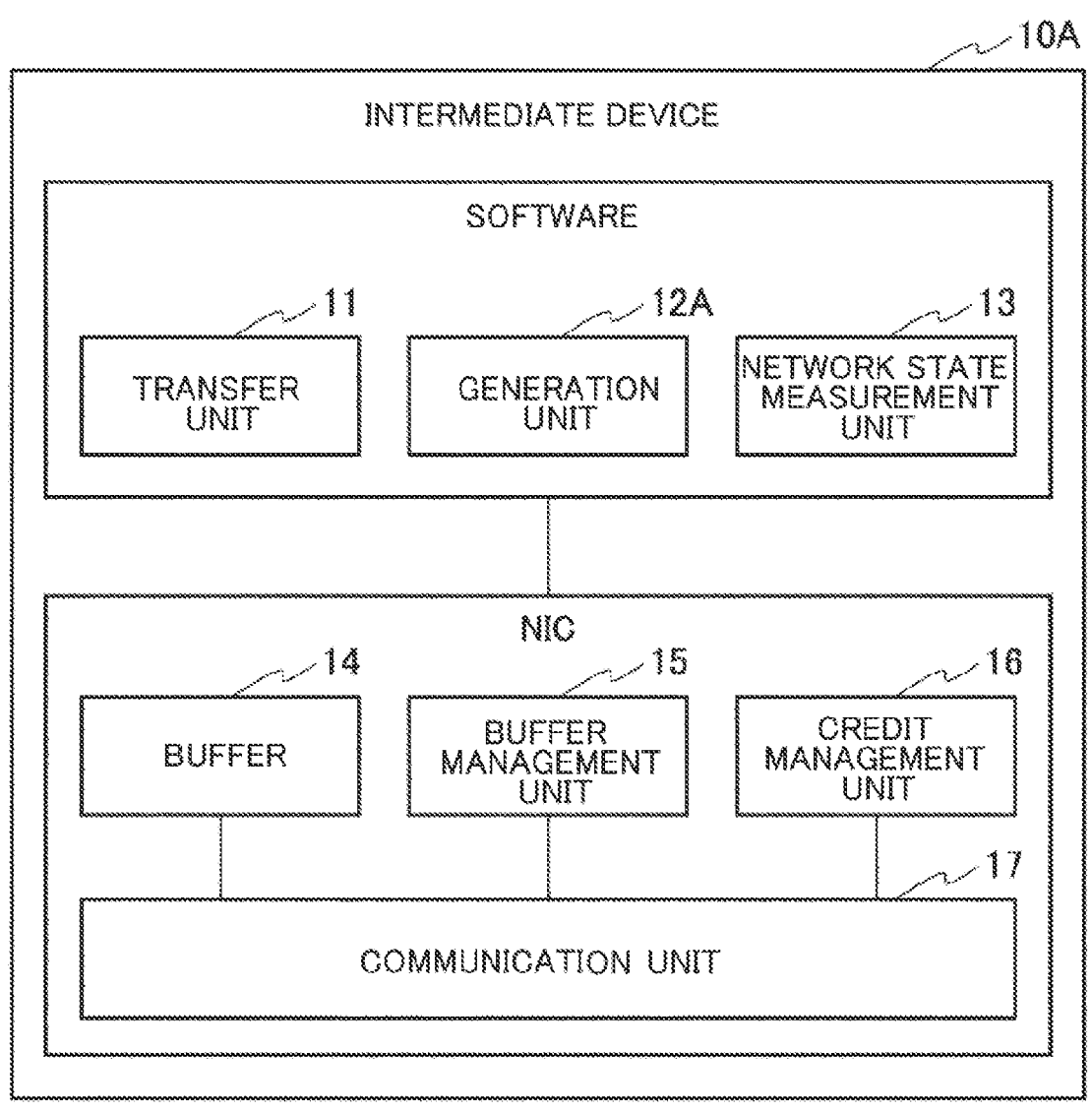
FIG. 4 is a diagram illustrating a configuration example of a first intermediate device.

FIG. 4 illustrates a configuration example of the intermediate device 10A (a first intermediate device). The intermediate device 10A includes a transfer unit 11, a generation unit 12A, a network state measurement unit 13, a buffer 14 (temporary data storage unit), a buffer management unit 15, a credit management unit 16, and a communication unit 17.

In the illustrated example, although the transfer unit 11, the generation unit 12A, and the network state measurement unit 13 are implemented in software (a CPU, a memory, a storage, etc.), these units may be mounted in a NIC. In addition, in the illustrated example, although a buffer 14, a buffer management unit 15, a credit management unit 16, and a communication unit 17 are implemented by a NIC, some of the units may be implemented by software. In addition, the intermediate device 10A may be implemented as a virtual machine or a container.

The transfer unit 11 receives a request from the local 30 and transfers the request to the remote 50. This request is, for example, above-mentioned SEND, SEND w/Imm, RDMA WRITE, RDMA WRITE w/Imm, ATOMIC Command, or the like. The request includes data to be transmitted from the local 30 to the remote 50 or an operation for data. The transfer unit 11 transmits a request via the communication unit 17.

When data (data size) to be transferred from the local 30 to the remote 50 is smaller than the credit (free size of a buffer) of the intermediate device 10B, the transfer unit 11 of the present embodiment transfers a request including the data to the intermediate device 10B. The credit management unit 16 receives the credit periodically transmitted from the intermediate device 10B.

Further, although the transfer unit 11 transmits data having size that is smaller than the credit of the intermediate device 10B in the present embodiment, for example, the credit of the buffer 14 of the intermediate device 10B is estimated from a release notification history of the credit transmitted from the intermediate device 10B, and if the size of the data is within the range of the estimated credit, the data having a size exceeding the credit of which is notified from the intermediate device 10B may be transmitted. In addition, when it is inferred that the retransmission cost is low, when it is estimated that the buffer of the intermediate device 10B is free at the time when communication data reaches the intermediate device 10B, or the like, the transfer unit 11 may transmit data having a size exceeding the credit of which is notified from the intermediate device 10B. Thus, the efficiency of data communication in credit-based flow control can be improved.

On the other hand, when the data to be transferred from the local 30 to the remote 50 has a size equal to or greater than the credit transmitted from the intermediate device 10B, that is, when the credit is insufficient, the transfer unit 11 queues (stores) the request in the buffer 14 and waits until the credit of the intermediate device 10B increases. In this case, the transfer unit 11 updates the credit of its own buffer 14.

When the request is transferred to the intermediate device 10B, the generation unit 12A generates a pseudo-response to the request and returns the pseudo-response to the local 30. Specifically, the generation unit 12A picks up a request transmitted from the local 30 and having a flag of "Only" or "Last", and generates a pseudo-response by using the PSN included in the request. The generation unit 12A returns the generated pseudo-response to the local 30. Further, for the pseudo-response (e.g., a pseudo-ACK) to the request, the value of the same PSN as the request for Only or Last is used.

Upon receiving the pseudo-response, the local 30 recognizes the pseudo-response as a response from the remote 50, stacks a CQE in the CQ, and normally completes the operation. Thus, a WQE in the SQ of the local 30 can be forcibly released.

The network state measurement unit 13 measures the state of the network 9 between the intermediate devices 10A and 10B. Specifically, the network state measurement unit 13 measures delay information about a delay of the network 9 by transmitting a packet or the like. The delay information includes a transmission delay, a transmission capacity, and the like of the network 9 (the path between the intermediate devices 10A and 10B).

The buffer management unit 15 acquires the delay information of the network 9 between the local 30 and the remote 50, determines the buffer size of the buffer 14 based on the delay information, and secures the buffer 14 having the determined size. For example, the buffer management unit 15 may calculate a value which is twice or more the product of the transmission delay and the transmission capacity (band) of the delay information as the buffer size. The buffer 14 temporarily stores data.

The credit management unit 16 executes credit-based flow control. The credit management unit 16 manages data related to flow control such as credit. The credit management unit 16 periodically receives a credit signal from the intermediate device 10B via the communication unit 17, and updates the credit stored in the credit management unit 16 based on the credit signal and a predetermined credit updating scheme. The credit signal received from the intermediate device 10B includes a credit indicating a free buffer size receivable by the intermediate device 10B (Kung & Morris, Credit-based flow control for ATM networks, IEEE Network, 9(2), 40-48 (1995)). In addition, the credit management unit 16 may periodically transmit the credit (free buffer size) of its own buffer 14 to the intermediate device 10B via the communication unit 17.

The communication unit 17 is a network interface for communication with other devices such as the local 30 and the intermediate device 10B.

Figure 5:
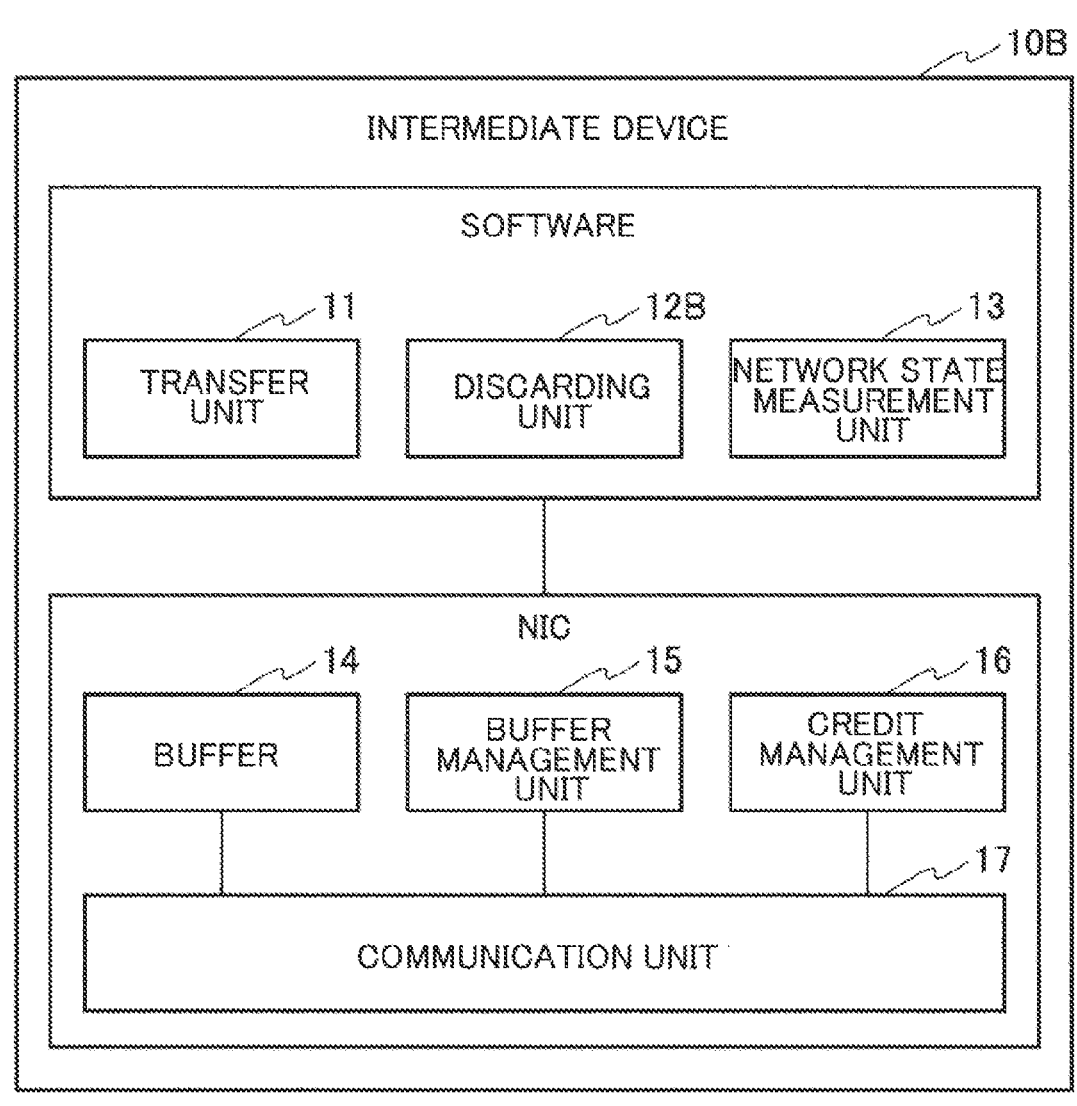
FIG. 5 is a diagram illustrating a configuration example of a second intermediate device.

FIG. 5 illustrates a configuration of the intermediate device 10B (a second intermediate device). The intermediate device 10B includes a transfer unit 11, a discarding unit 12B, a network state measurement unit 13, a buffer 14, a buffer management unit 15, a credit management unit 16, and a communication unit 17.

The transfer unit 11 transfers a request transmitted by the local 30 to the remote 50 via the intermediate device 10A. The transfer unit 11 of the present embodiment transfers the request to the remote 50 and queues the request in the buffer 14 to update its own credit.

The discarding unit 12B discards a response received from the remote 50 with respect to the request. Thus, this prevents the local 30 from receiving the response in an overlapping manner. Furthermore, since there is a possibility that a malfunction may occur when a NAK for RNR or out-of-sequence transmitted from the remote 50 arrives at the local 30, the discarding unit 12B discards such a NAK as well. The discarding unit 12B of the present embodiment discards the response received from the remote 50 with respect to the request, deletes the request queued in the buffer 14, and updates the credit.

The network state measurement unit 13, the buffer 14, the buffer management unit 15, the credit management unit 16, and the communication unit 17 of the intermediate device 10B are similar to the network state measurement unit 13, the buffer 14, the buffer management unit 15, the credit management unit 16, and the communication unit 17 of the intermediate device 10A.

Figure 6:
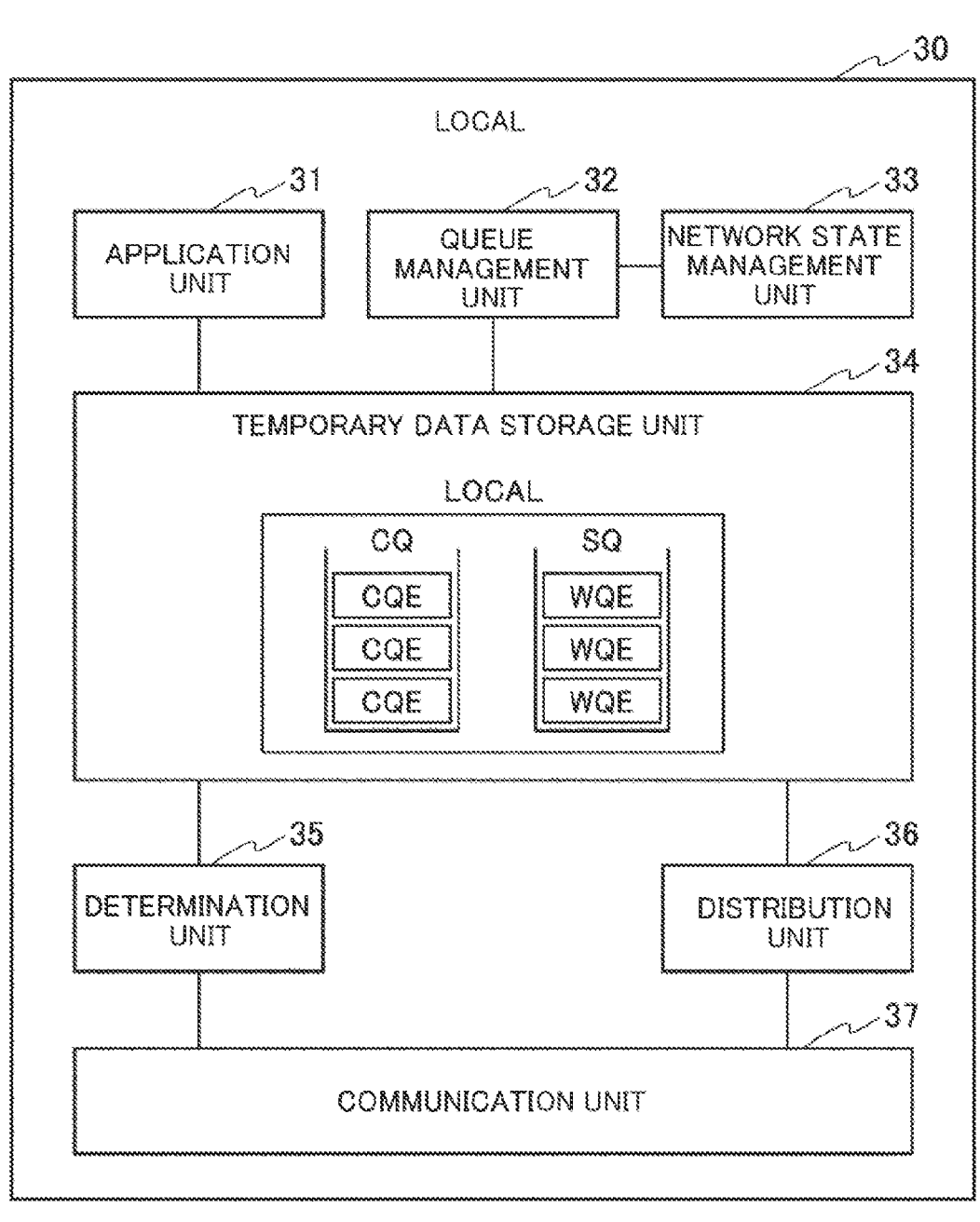
FIG. 6 is a diagram illustrating a configuration example of a local.

FIG. 6 illustrates a configuration of the local 30. The local 30 includes an application unit 31, a queue management unit 32, a network state management unit 33, a temporary data storage unit 34, a determination unit 35, a packet distribution unit 36, and a communication unit 37.

The application unit 31 transmits/receives a request including transfer data to/from the remote 50 by using RDMA communication.

The queue management unit 32 manages each of queues (CQ and SQ) of the temporary data storage unit 34. The queue management unit 32 may calculate a required queue size based on delay information of the network 9 and determine the depth of the queue of the temporary data storage unit 34. The temporary data storage unit 34 of the local 30 has a CQ and a SQ as queues.

The network state management unit 33 manages a state of the network 9. Specifically, the network state management unit 33 may acquire delay information about a delay of the network 9 from another device, or may measure delay information by transmitting a packet, or the like. The delay information includes a transmission delay, a transmission capacity, and the like.

The distribution unit 36 distributes data (packets) received via the communication unit 37 to a corresponding QP of the temporary data storage unit 34. In addition, when the received data is delay information, the data is distributed to the network state management unit 33 or the queue management unit 32.

The determination unit 35 may determine whether to transmit a request via the intermediate devices 10A and 10B based on the delay information. The queue management unit 32 may determine a queue depth of the temporary data storage unit 34 based on the delay information when it is determined to perform communication without going through the intermediate devices 10A and 10B. The local 30 of the present embodiment may not include the network state management unit 33 and the determination unit 35.

The communication unit 37 is a network interface for communication with other devices such as the intermediate device 10A.

Further, the queue management unit 32 and the network state management unit 33 may be implemented as a function of an NIC. The application unit 31 is not limited to the case where it is implemented on the CPU and memory of the local 30, and may be implemented by a hardware accelerator such as a GPU, a FPGA or an NIC connected by another internal bus.

A configuration of the remote 50 is similar to that of the local 30 illustrated in FIG. 6. However, the temporary data storage unit 34 of the remote 50 includes a CQ and a RQ.

<Operation of Communication System>

Figure 7:
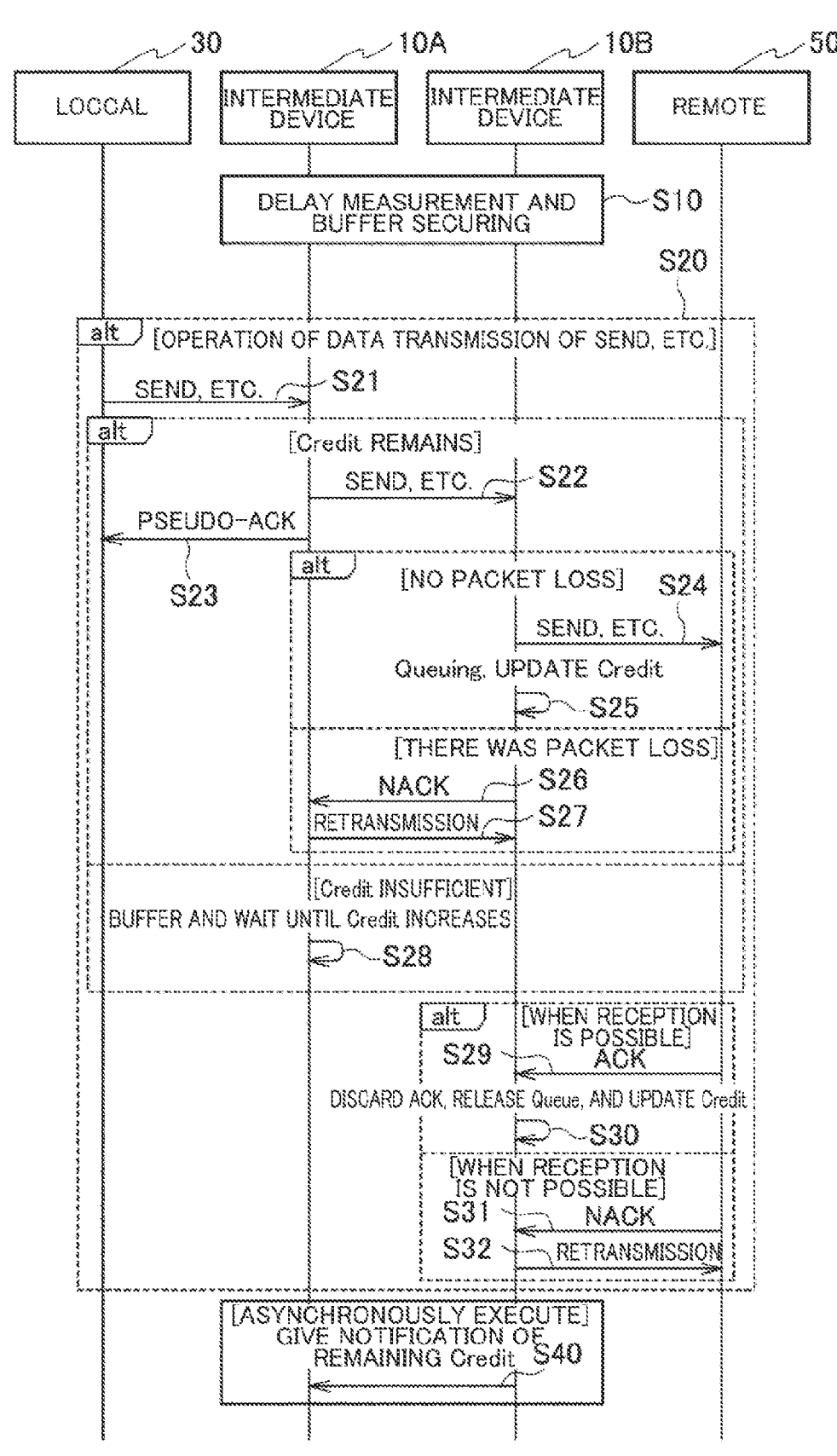
FIG. 7 is a sequence diagram illustrating an example of the flow of processing of the communication system illustrated in FIG. 3.

An example of the flow of processing by the communication system of the present embodiment will be described with reference to FIG. 7.

In step S10, each of the intermediate devices 10A and 10B measures delay information (a transmission delay and a transmission capacity) of the network 9, and secures the buffer 14 based on the measurement result. Specifically, the intermediate devices 10A and 10B measure the state of the network 9 by transmitting packets or the like. The intermediate devices 10A and 10B calculate a required buffer size based on the delay information and secure the buffer 14 in the corresponding buffer size. For example, the intermediate devices 10A and 10B may calculate the value twice or more the product of the transmission delay time and the transmission capacity (band) as the buffer size.

Further, in step S10, the intermediate devices 10A and 10B may exchange a communication mode available in their own device with the partner device to determine a communication mode to be used based on the measurement result of step S10.

Next, in step S20, the local 30 and the remote 50 transmit and receive data via the intermediate devices 10A and 10B. Specifically, the local 30 stacks WQEs in the SQ and transmits a request to the remote 50 (step S21). Here, a case where a SEND request is transmitted will be described as an example.

The intermediate device 10A compares the data size of the request received from the local 30 with the credit received from the intermediate device 10B. If the data size of the request is smaller than the credit of the intermediate device 10B, that is, if the credit remains, the intermediate device 10A transmits the request to the intermediate device 10B (step S22). At this time, the intermediate device 10A may queue the request received from the local 30 in the buffer and update its own credit.

The intermediate device 10A generates a pseudo-response (pseudo-ACK) by using the PSN included in the request, and returns the pseudo-response to the local 30 (step S23). Upon receiving the pseudo-response, the local 30 stacks a CQE in the CQ and releases a WQE of the SQ.

If no packet loss occurs in the request transmitted from the intermediate device 10A, the intermediate device 10B transmits the request transmitted from the intermediate device 10A to the remote 50 (step S24), queues the request in the buffer 14, and updates the credit (step S25).

On the other hand, if packet loss occurs, the intermediate device 10B transmits a NACK to the intermediate device 10A (step S26), and receives a request retransmitted from the intermediate device 10A (step S27). If no packet loss occurs in the retransmitted request, the intermediate device 10B advances to S24.

In addition, if the data size of the request of the step S21 is equal to or greater than the credit of the intermediate device 10B, that is, if the credit of the intermediate device 10B is insufficient, the intermediate device 10A queues the request in the buffer 14 and waits until the credit of the intermediate device 10B increases (step S28) When the credit of the intermediate device 10B becomes greater than the data size of the request, the intermediate device 10A advances to S22.

If the request of step S24 is successfully received, the remote 50 transmits a response of ACK to the intermediate device 10B (step S29) The intermediate device 10B discards the response received from the remote 50, releases the request queued in the buffer 14 in step S25, and updates the credit (step S30).

On the other hand, if the request of step S24 is not normally received, the remote 50 transmits a response of NACK to the intermediate device 10B (step S31), and receives a request retransmitted from the intermediate device 10B (step S32). If the retransmitted request is normally received, the remote 50 advances to step S29, and the intermediate device 10B performs step S30.

The intermediate device 10B periodically transmits its own credit to the intermediate device 10A at a prescribed timing by using a timer or the like, which is not illustrated, asynchronously with the data transmission/reception of S20 (step S40). Thus, the intermediate device 10A acquires the credit of the intermediate device 10B and updates the credit of the intermediate device 10B stored in the credit management unit 16.

<Resolution of Destination QPN>

In the interface of RDMA, a QP has a QPN that differs for each endpoint. SQ/RQ recognize the opposite QPN, and includes a destination QPN in the header when generating a RDMA packet. However, a transmission source QPN is not included in the header. When the intermediate device 10A generates a pseudo-response, the received request has no information indicating a transmission source QPN, and thus the destination of the pseudo-response is unknown. Therefore, in the present embodiment, the destination of the pseudo-response is specified in the following two methods.

Figure 8:
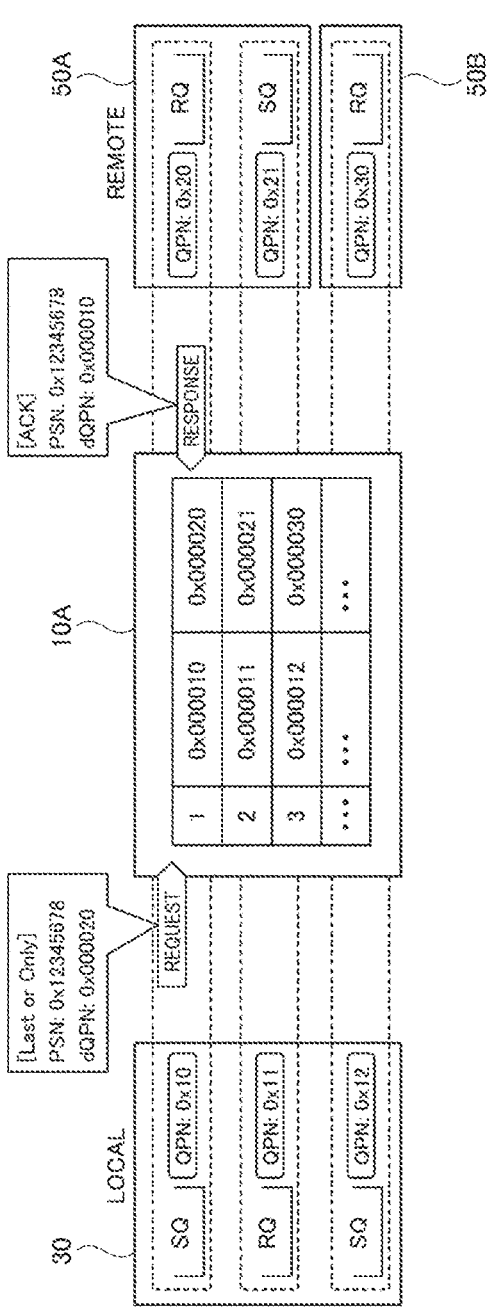
FIG. 8 is a diagram for explaining an example of a method for solving a destination QPN of a response by creating a table.

The first method is a method for checking exchange of the original RDMA request and response, and storing the combination of QPNs in a table. The same PSN is used for the request for Only or Last and an ACK for a RDMA packet. Then, the intermediate device 10A inspects the request and the response that have passed, combines destination QPNs of the header of the request for Only or Last and the ACK having the same PSN with each other, and adds the combination to a table. In the example illustrated in FIG. 8, since the destination QPNs of the headers of the request and the response having the same PSN are 0x000020 and 0x000010, respectively, a combination of 0x000010 and 0x000020 is added to the table. Further, in FIG. 8, the local 30 constitutes a QP with a remote 50A and with a remote 50B, respectively.

When the intermediate device 10A generates a pseudo-response, a combination of QPNs including the destination QPN of the request is acquired from the table, and the other QPN of the combination is set to a destination QPN of the pseudo-response. For example, when the destination QPN receives a request of 0x000020, the intermediate device 10A acquires a combination of 0x000010 and 0x000020 including 0x000020 from the table, and sets 0x000010 for the destination QPN of the pseudo-response.

Figure 9:
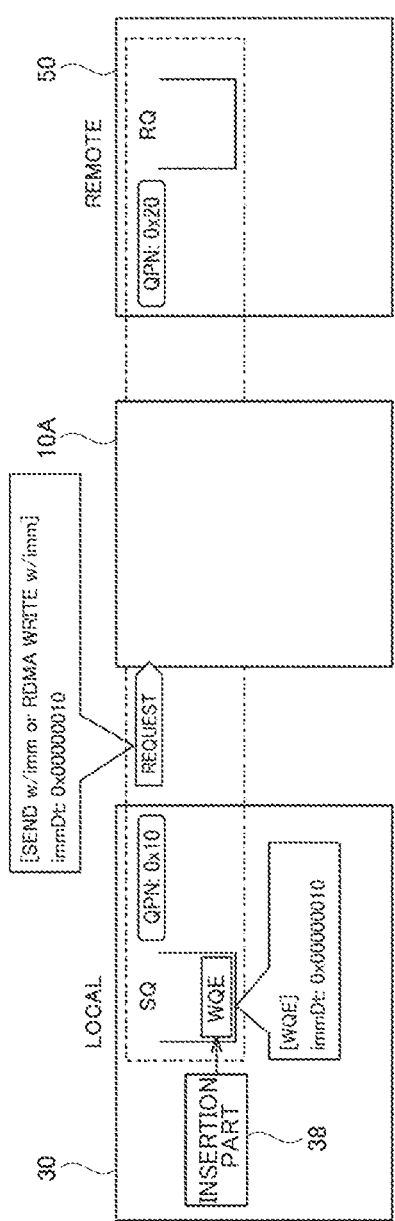
FIG. 9 is a diagram for explaining an example of a method for solving a destination QPN of a response by giving a notification of a source QPN.

The second method is a method for placing a source QPN in the RDMA packet. A WQE has a 32-bit immediate Date (immDt) field, and any 32-bit information can be written in the immDt field only in SEND with immediate or the RDMA WRITE with immediate. In FIG. 9, the local 30 has an insertion unit 38, and the insertion unit 38 writes the QPN of the SQ on the local 30 side into the immDt field of the WQE of the SQ on the local 30 side.

When the intermediate device 10A generates a pseudo-response, the QPN written in the immDt field of the received request is set to the destination QPN of the pseudo-response.

The present embodiment described above is about the communication system including the intermediate device 10A and the intermediate device 10B, in which the intermediate device 10A and the intermediate device 10B are arranged between the local 30 and the remote 50 for transferring data using RDMA, and the intermediate device 10A includes the buffer management unit 15 that determines a buffer size based on delay information about a delay of the network 9 between the intermediate device 10A and the intermediate device 10B and secures the buffer 14 in the buffer size, the transfer unit 11 that, when data to be transferred from the local 30 to the remote 50 is smaller than a credit of the intermediate device 10B, transfers a request including the date to the intermediate device 10B, and the generation unit 12A that generates a pseudo-response to the request and returns the pseudo-response to the local 30. The intermediate device 10B includes the buffer management unit 15 that determines a buffer size based on delay information and secures the buffer 14 in the buffer size, the transfer unit 11 that transfers the request to the remote 50 and stores the request in the buffer 14 to update the credit of the own device, and the discarding unit 12B that discards a response received from the remote 50 with respect to the request, deletes the request stored in the buffer 14, and updates the credit.

In the present embodiment, because the local 30 releases WQEs of the SQ in response to the pseudo-response from the intermediate device 10A, even when the round trip time (RTT) taken between the local 30 and the remote 50 is long, high-band data transfer can be realized without waiting for a response from the remote 50.

In addition, in the present embodiment, by introducing credit-based flow control to the intermediate devices 10A and 10B, it is possible to prevent transmission of data beyond the capacity of the intermediate device 10B on the remote 50 side. That is, the intermediate device 10A transmits data in consideration of the amount of data that the intermediate device 10B can receive. For this reason, transmission of data beyond the capacity of the intermediate device 10B can be prevented, and the occurrence of data loss on the remote side can be avoided. Therefore, in the present embodiment, even if the transfer destination of RDMA is at a long distance, high-speed and high-reliability data transfer can be realized, and communication between the intermediate devices 10A and 10B can be guaranteed.

Furthermore, in the present embodiment, a retransmission function for a NACK is given to the intermediate devices 10A and 10B to cope with data loss.

3. Second Embodiment

<Configuration of Communication System>

In the communication system of the first embodiment, since the intermediate devices 10A and 10B measure the state of the network 9 when starting data transfer, it takes time to start data transfer. In the present embodiment, when an orchestrator 70 sets an optical path (transmission line) of the network 9, the orchestrator 70 calculates or measures a delay and notifies the intermediate devices 10A and 10B of the delay. Thus, in the present embodiment, the process of measuring a state of the network 9 performed by the intermediate devices 10A and 10B of the first embodiment is omitted, and therefore, the time required to start data transfer can be shortened.

Figure 10:
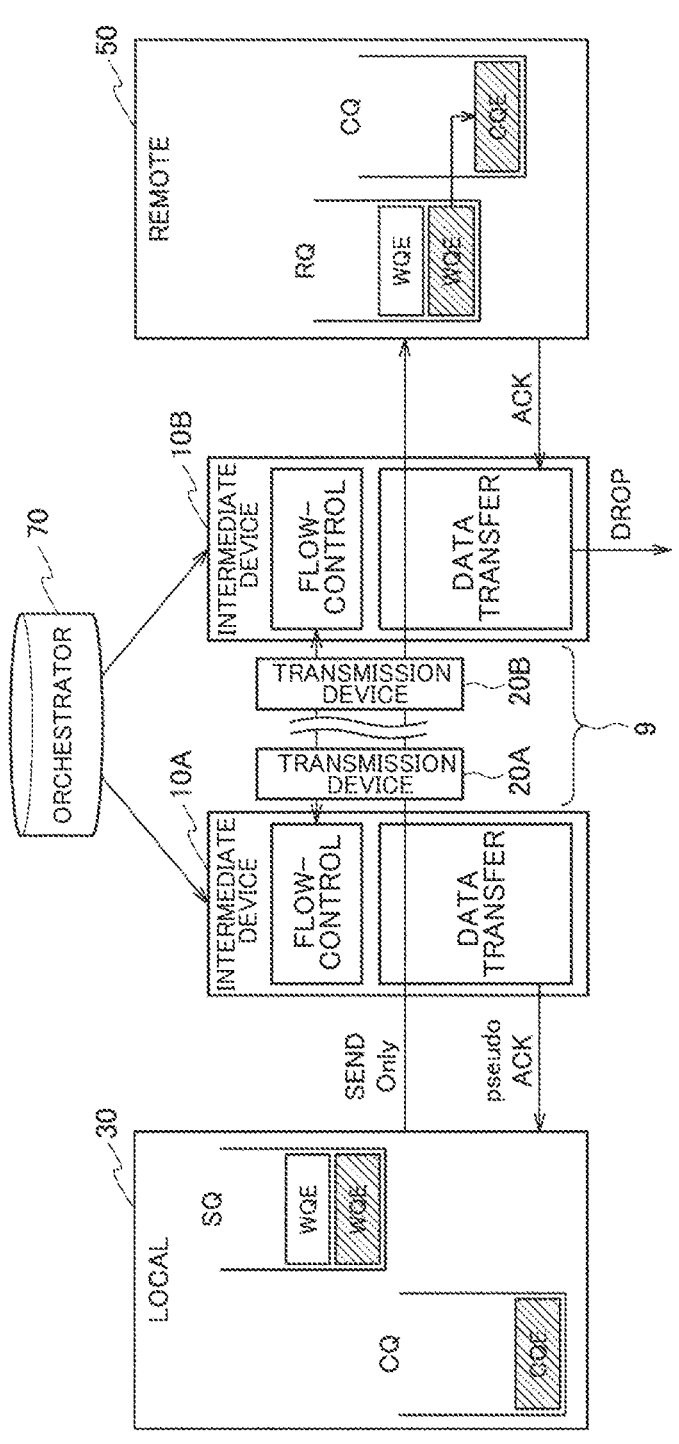
FIG. 10 is a diagram illustrating an example of a configuration of a communication system of a second embodiment.

FIG. 10 is a diagram illustrating an example of a configuration of a communication system of the present embodiment. The communication system of the present embodiment includes intermediate devices 10A and 10B and an orchestrator 70.

The intermediate devices 10A and 10B according to the present embodiment are similar to the intermediate devices 10A and 10B (FIG. 4 and FIG. 5) of the first embodiment. However, a network state measurement unit 13 of the intermediate devices 10A and 10B of the present embodiment does not measure a state of the network 9, but acquires delay information about a delay (a transmission delay, a transmission capacity, optical path information, etc.) from the orchestrator 70.

The orchestrator 70 monitors and manages the entire network 9 such as an optical transport network and controls the network 9 in a centralized manner. The orchestrator 70 operates between a computer (of the local 30 and the remote 50) of an upper layer and the optical transport network of a lower layer, and constructs an optical path on an optical transport network by setting and controlling an optical network device based on communication requirements from the computer and a state of an optical transmission line of the optical transport network. Thus, the optical transport network can be automatically and optimally controlled in response to a request from computers that are geographically distributed without manual operations.

Figure 11:
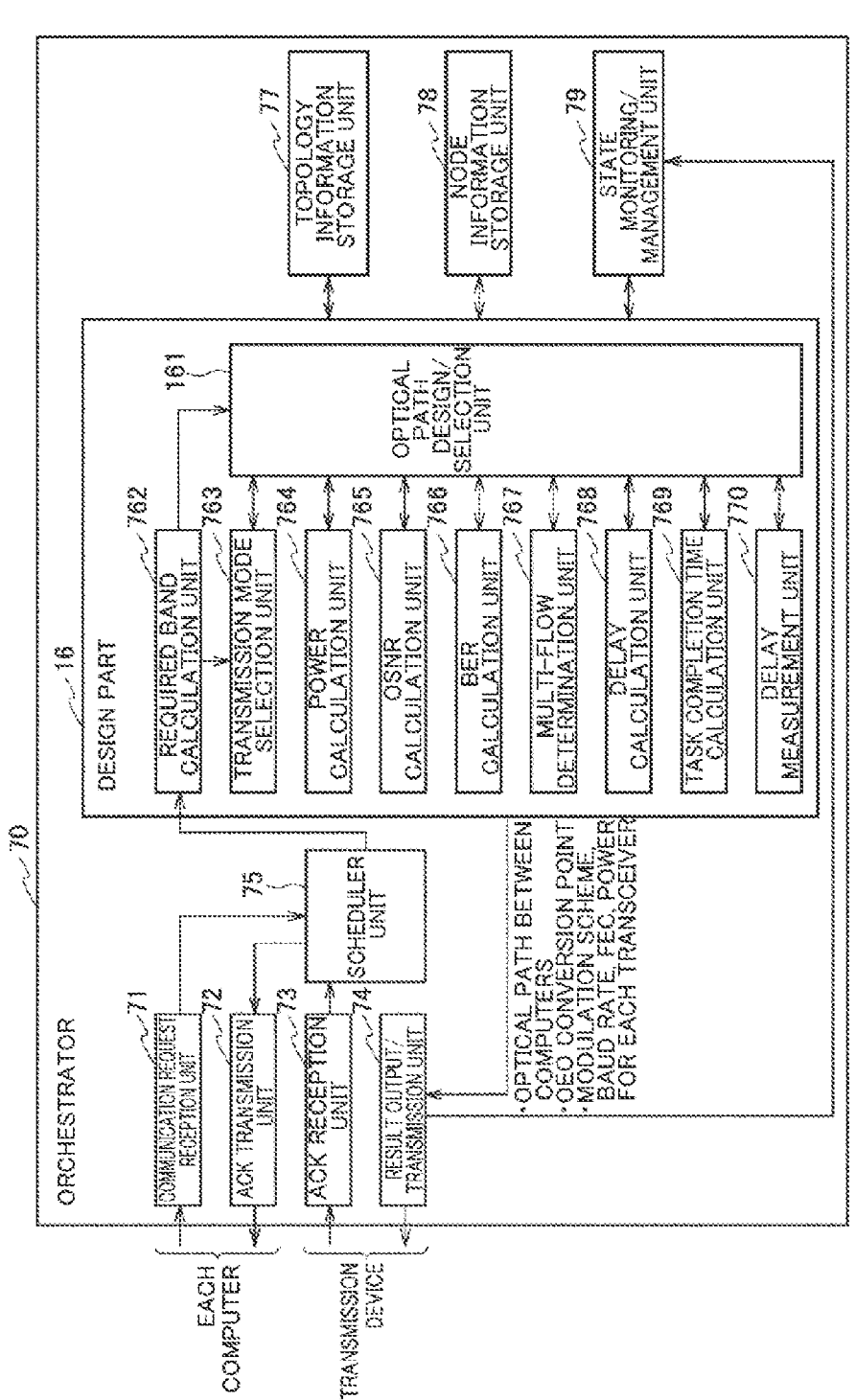
FIG. 11 is a diagram illustrating a configuration example of an orchestrator.

FIG. 11 is a diagram illustrating an example of a configuration of the orchestrator 70. The orchestrator 70 of the present embodiment sets an optical path on the network 9 (optical transport network) in accordance with communication requirements from the local 30, and calculates or measures delay information of the optical path.

The illustrated orchestrator 70 includes a communication request reception unit 71, an ACK transmission unit 72, an ACK reception unit 73, a result output/transmission unit 74, a scheduler unit 75, a design unit 76, a topology information storage unit 77, a node information storage unit 78, and a state monitoring/management unit 79.

The communication request reception unit 71 receives a communication request including communication requirements related to communication from the local 30 (or the remote 50). The communication requirements include the type of an application for performing communication, a required band, a total amount of data, an allowable delay time, a task completion time, a code error rate (Bit Error Rate (BER)), power, and the like. The communication request may be such as desiring to complete the task within 10 msec, backing up data, transferring 1-TBite data from the local 30 to the remote 50, and the like.

The ACK transmission unit 72 receives a setting completion response of setting information from each of transmission devices 20A and 20B (optical NW devices) in the network 9 and then transmits a setting completion notice of the optical path to the local 30 and the remote 50. That is, the ACK transmission unit 72 notifies the local 30 as the request source of an ACK indicating the completion of the construction of the optical path as soon as the local 30 as the request source and the remote 50 as the request destination become communicable after the construction of the optical path is completed in the network 9.

The ACK reception unit 73 receives the setting completion response of the setting information for an optical NW device included in the transmission devices 20A and 20B from each of the devices.

The result output/transmission unit 74 transmits the setting information for the optical NW device of each of the transmission devices 20A and 20B to each of the transmission device 20A and 20B. That is, the result output/transmission unit 74 transmits the following setting information designed and selected to optimally control the network 9 to the optical NW device group constituting the network 9.

Optical path between computers

Optical-electron-optical (OEO) conversion point (=insertion position of DSP)

(i) a modulation scheme, (ii) a baud rate, (iii) a transmission power, and (iv) overhead of Forward Error Correction (FEC) which are set in the transceiver of each of the transmission devices 20A and 20B.

More specifically, the following setting information is assumed.

Setting of (i) a modulation scheme, (ii) a baud rate, (iii) a transmission power, and (iv) FEC (overhead) for the optical NW device group existing in the optical path between the computers, an OEO conversion point, and each of the transmission devices 20A and 20B, which are designed and selected to satisfy the communication requirements Setting of (i) a modulation scheme, (ii) a baud rate, (iii) a transmission power, and (iv) FEC (overhead) for the optical NW device group existing in the optical path between the computers, the OEO conversion point, and each of the transmission devices 20A and 20B, which are designed and selected such that the amount of resources used in the entire optical transport network is minimum Setting of (i) a modulation scheme, (ii) a baud rate, (iii) a transmission power, and (iv) FEC (overhead) for the optical NW device group existing in the optical path between the computers, the OEO conversion point, and each of the transmission devices 20A and 20B, which are designed and selected such that the amount of power used in the entire optical transport network is minimum The result output/transmission unit 74 transmits the setting information to each of the transmission devices 20A and 20B, and causes the optical NW device of each of the transmission devices 20A and 20B to set the setting information. Further, the optical NW device includes a transceiver (transponder), an optical cross-connect (OXC), a re-configurable optical add/drop multiplexer (ROADM), an amplifier, and the like.

The scheduler unit 75 manages and schedules communication requests received from the local 30. Since a fixed time is required until the design/opening of the optical path is completed, when a plurality of communication requests are mixed, the scheduler unit 75 performs scheduling from a communication request with high priority.

The design unit 76 determines an optical path to be used for communication of the local 30 based on the communication requirements received from the local 30 and the state of the optical transmission line of the network 9, and calculates setting information set to the optical NW device of each of the transmission devices 20A and 20B for constructing the optical path.

The design unit 76 includes an optical path design/selection unit 761, a required band calculation unit 762, a transmission mode selection unit 763, a power calculation unit 764, an OSNR calculation unit 765, a BER calculation unit 766, a multi-flow determination unit 767, a delay calculation unit 768, and a task completion time calculation unit 769.

The optical path design/selection unit 761 lists a set of candidate optical paths, and selects an optimum optical path based on the communication requirements received from the local 30. "Optimum" means being optimum in terms of, for example, a delay, a task completion time, a required band, an amount of resources used in the entire network 9, and power consumption of the entire network 9.

In order to select an optimum optical path, the optical path design/selection unit 761 cooperates with the required band calculation unit 762, 763, 764 . . . , and a delay measurement unit 770 and refers to information about the network 9 stored in the topology information storage unit 77, the node information storage unit 78 and the state monitoring/management unit 79. Further, although there is a trade-off relationship between the transmission capacity and the distance, References 1 to 3 described later can be utilized as a method for selecting an optimum optical transmission mode according to the distance by taking the relationship into consideration.

The required band calculation unit 762 calculates a required band based on the communication requirements received from the local 30 in communication between the local 30 and the remote 50 (a request source and a request destination).

The transmission mode selection unit 763 lists candidate transmission modes based on the band required for communication between the local 30 and the remote 50 and the type of the application. The transmission mode selection unit 763 computes a modulation scheme, a baud rate, FEC, and the like to be set for each transceiver in a candidate transmission mode on an optical path which is a certain candidate between the local 30 and the remote 50. Further, Reference 4 (WO 2020/031514 A1) can be used as a method for selecting an optimum transmission mode based on these parameters.

The power calculation unit 764 calculates an appropriate transmission power to be set for each transceiver in an optical path which is a certain candidate between the local 30 and the remote 50.

The OSNR calculation unit 765 calculates an OSNR on an optical path which is a certain candidate between the local 30 and the remote 50. The OSNR calculation unit 765 uses a network state of a certain optical path between the local 30 and the remote 50 as an input value, and uses an OSNR on the input optical path as an output value. For a method for calculating an OSNR, Reference 1 can be used.

Reference 1 is "GNPy: An open source application for physical layer aware open optical networks," by A. Ferrari, and eight others, in Journal of Optical Communications and Networking, vol. 12, No. 6, 2020, p. C31-p. C40.

The BER calculation unit 766 calculates a BER based on the OSNR and the margin on a certain optical path. For example, referring to Reference 2, $BER_{P,\lambda}$ when the optical path P is established at the wavelength $\lambda$ can be calculated by the equation (1).

$$BER_{p,\lambda} = \psi\,(OSNR_{p,\lambda} - M_T(\tau) - M_d(\tau)) \qquad (1)$$

Further, $\psi(.)$ is a BER calculation formula corresponding to a specific modulation format of a specific optical path. $M_T(\tau)$ is a system margin based on deterioration due to aging. $M_d(\tau)$ is a design margin.

Reference 2 is "Multi-period planning with actual physical and traffic conditions," by P. Soumplis and four others, in IEEE/OSA Journal of Optical Communications and Networking, vol. 10, No. 1, 2018, p. A144-p. A153.

The multi-flow determination unit 767 determines whether multi-flow is necessary on a section constituting the optical path based on the communication requirements received from the local 30 on an optical path which is a certain candidate between the local 30 and the remote 50. For a technique related to multi-flow of communication, Reference 3 can be used.

Reference 3 is "Multiflow optical transponder for efficient multilayer optical networking," by M. Jinno and four others, in IEEE Communications Magazine, vol. 50, No. 5, 2012, p. 56-p. 65.

The delay calculation unit 768 calculates a transmission delay time on a certain optical path between the local 30 and the remote 50. In the calculation of the transmission delay time, the delay calculation unit 768 uses topology information of the optical path and the network 9 between the local 30 and the remote 50 as an input value, and uses a transmission delay on the input optical path as an output value. Further, the transmission delay time is basically determined based on a distance between the nodes.

The task completion time calculation unit 769 calculates a task completion time required for completion of a task of communication based on a selected candidate optical path.

The delay measurement unit 770 may actually measure a transmission delay time on a certain optical path between the local 30 and the remote 50 by using each of the transmission devices 20A and 20B. The transmission delay time may be calculated by the delay calculation unit 768 or measured by the delay measurement unit 770.

The topology information storage unit 77 holds topology information about a connection and a distance between the transmission devices 20A and 20B. The topology information is required for optical path design, multi-flow determination, and the like.

The node information storage unit 78 holds node information about the type and the number of transceivers present in the transmission devices 20A and 20B. Since the node information has different reception sensitivity (necessary OSNR) depending on the types of transceivers, it is necessary for optical path design. The node information storage unit 78 holds node information about the type and the number of amplifiers present in the transmission devices 20A and 20B. The node information is required because the noise figure (NF) differs depending on the type of the amplifier, such as Raman amplification or an erbium-doped fiber amplifier (EDFA). The node information storage unit 78 also holds node information about the type and form (the number of ports or the like) of optical nodes (OXC and ROADM) present in the respective transmission devices 20A and 20B.

The state monitoring/management unit 79 holds monitoring/management information about the use state and state of an amplifier, a transceiver, and an optical node present in each of the transmission devices 20A and 20B. The state monitoring/management unit 79 also holds monitoring/management information about loss of optical signals such as a use state of a wavelength at each link, deterioration due to aging, a splice at each link, and a connector location. The monitoring/management information is information necessary for selecting an optical path (wavelength path) because nonlinear effects (especially, cross phase modulation (XPM)), and four-wave mixing (FWM)) affects loss and the BER according to a use state of a wavelength. The state monitoring/management unit 79 updates the stored information in accordance with the addition/deletion of an optical path. The state monitoring/management unit 79 is connected to the optical transmission line measurement unit of each of the transmission devices 20A and 20B, periodically receives transmission line information about the state/margin of the transmission line, and stores the transmission line information to be successively updated.

Figure 12:
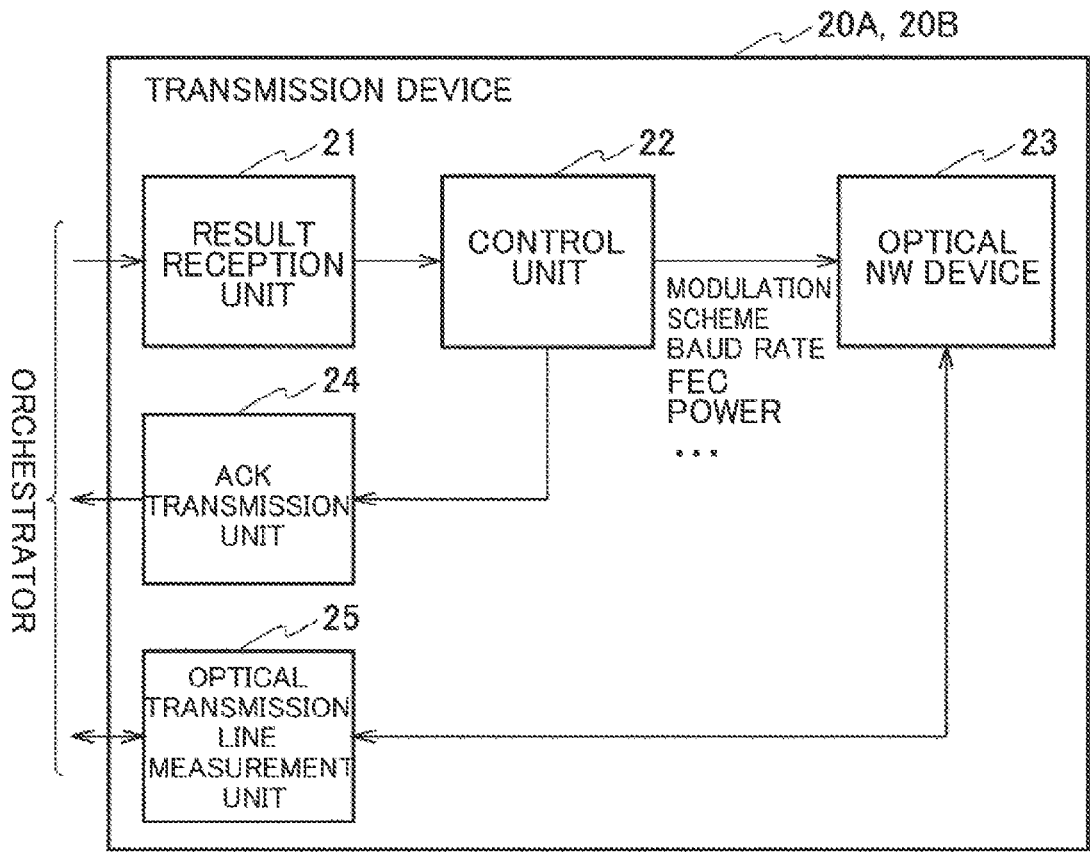
FIG. 12 is a diagram illustrating a configuration example of a transmission device.

FIG. 12 is a diagram illustrating an example of a configuration of each of the transmission devices 20A and 20B. The transmission devices 20A and 20B are nodes constituting the network 9. Each of the transmission devices 20A and 20B includes a result reception unit 21, a control unit 22, an optical NW device 23, an ACK transmission unit 24, and an optical transmission line measurement unit 25.

The result reception unit 21 receives setting information for the optical NW device 23 of its own node from the orchestrator 70. That is, the result reception unit 21 receives setting information to be set in the optical NW device 23 from the orchestrator 70, and passes the setting information to the control unit 22.

The control unit 22 sets and controls the setting information received from the orchestrator 70 in the optical NW device 23 of its own node. That is, the control unit 22 sets and controls the optical NW device 23 in the following manner based on the setting information received from the orchestrator 70.

Setting of transmission modes (a modulation system, a baud rate, FEC, etc.) and transmission power in each transceiver (transponder)

Setting of a wavelength to be added, dropped, or passed through for a ROADM or an OXC Allocation of the wavelength to be amplified to an amplifier Upon completion of the setting and control, the control unit 22 notifies the ACK transmission unit 24 of the completion.

The optical NW device 23 is a device constituting the network 9, such as a transceiver, an OXC, a ROADM, or an amplifier.

The ACK transmission unit 24 transmits a setting completion response to the orchestrator 70 after completing setting of the setting information in the optical NW device 23. In other words, the ACK transmission unit 24 notifies the orchestrator 70 of an ACK indicating the completion as soon as the setting in the optical NW device 23 and control are completed.

The optical transmission line measurement unit 25 measures the state and margin of the optical transmission line (optical bus) of the network 9 and transmits the measurement result to the orchestrator 70. That is, the optical transmission line measurement unit 25 is a measurement device for measuring the actual state and margin of the optical transmission line. For example, the optical transmission line measurement unit 25 estimates and calculates the state of the optical transmission line periodically or when there is a request based on a signal received by a coherent DSP and transmits the state information of the optical transmission line to the orchestrator 70 according to Reference 5. The transmission line measurement unit 25 may measure delay information about delay such as a transmission delay time and a transmission capacity of the optical transmission line.

Reference 5 is "Simultaneous Detection of Anomaly Points and Fiber Types in Multi-Span Transmission Links Only by Receiver-Side Digital Signal Processing" by T. Sasai and eight others, in Optical Fiber Communication Conference (pp. Th1F-1), Optical Society of America, 2020.

When communicating with the remote 50, the application unit 31 of the local 30 of the present embodiment transmits a communication request including communication requirements about the communication to the orchestrator 70. In addition, the network state management unit 33 receives a setting completion notification (ACK) of an optical path constructed on the network 9 and delay information of the set optical path from the orchestrator 70. The delay information includes information about a transmission delay time, a transmission capacity, and an optical path, etc. The local 30 may include a wavelength variable transceiver capable of dynamically switching wavelengths. The remote 50 is similar to the local 30.

<Operation of Communication System>

Figure 13:
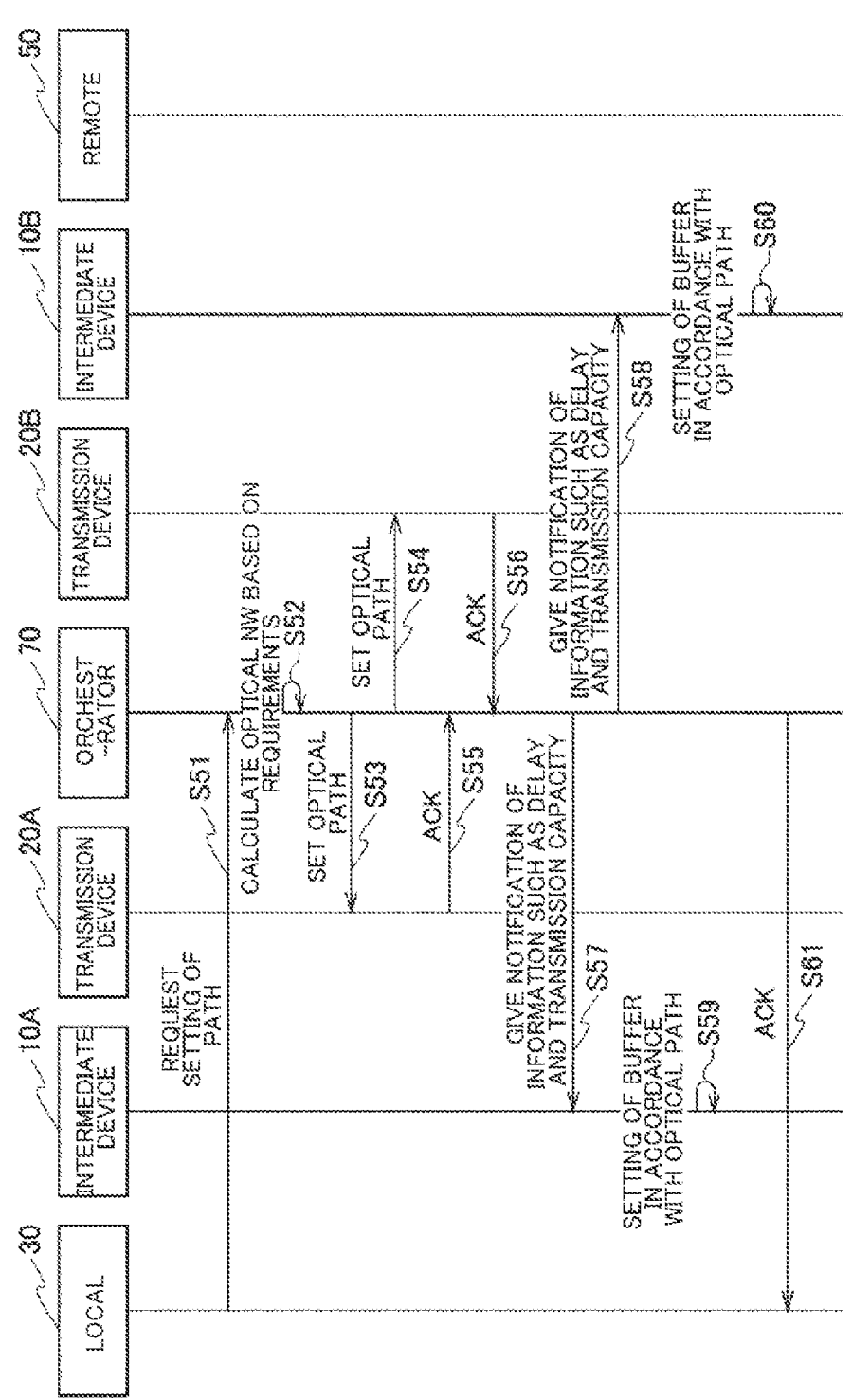
FIG. 13 is a sequence diagram illustrating an example of the flow of processing of the communication system illustrated in FIG. 10.

FIG. 13 is a sequence diagram illustrating an operation of the communication system of the present embodiment.

In order to communicate with the remote 50, the local 30 transmits a communication request (a path setting request) designating communication requirements to the orchestrator 70 (step S51). The communication request includes transfer of data and a file, transmission and distribution of video images, and the like. The communication requirements include a type of an application for performing the communication, a required band, a total amount of data, an allowable delay time, a task completion time, a BER, power, and the like. The local 30 may transmit the communication request to the intermediate device 10A or the transmission device 20A. In this case, the intermediate device 10A or the transmission device 20A transmits a communication request to the orchestrator 70.

The orchestrator 70 determines an optical path to be used for communication of the local 30 based on the communication requirements from the local 30 and the state of the network 9 previously received from each transmission device arranged on the network 9, and calculates setting information to be set in the optical NW device 23 of each transmission device 20 to construct the optical path (step S52).

For example, the orchestrator 70 calculates setting information about (i) a modulation scheme, (ii) a symbol rate, (iii) a transmission power, and (iv) FEC (overhead) to be set for the optical path between the local 30 and the remote 50, an OEO conversion point, and the transceiver of each transmission device 20.

At this time, the orchestrator 70 calculates a delay, a task completion time, a required band, an amount of resources used by the entire network 9, and an amount of power consumed by the entire network 9 so that the calculated values are optimal. For example, the orchestrator 70 calculates the setting information so that the communication requirements are satisfied, calculates the setting information so that the amount of resources used by the entire network 9 is minimized, and/or calculates the setting information so that the amount of power consumed by the entire network 9 is minimized.

The orchestrator 70 transmits the setting information to each of the transmission device 20A and the transmission device 20B, and instructs a setting of the optical bus (steps S53 and S54).

Each of the transmission devices 20A and 20B sets and controls the setting information for the optical NW device 23 of its own node. For example, the transmission devices 20A and 20B set a transmission mode (a modulation system, a symbol rate, FEC, etc.) and a transmission power for each transceiver based on the setting information, sets a wavelength to be add, dropped, or passed through for the ROADM or OXC, and allocates the wavelength to be amplified to the amplifier.

Each of the transmission devices 20A and 20B notifies the orchestrator 70 of the ACK indicating the completion as soon as the transmission devices completes setting and controlling for the optical NW device 23 (steps S55 and S56).

The orchestrator 70 transmits delay information including the transmission delay, transmission capacity of the set optical path and information about the optical path to the intermediate devices 10A and 10B (steps S57 and S58).

The transmission devices 20A and 20B compute a buffer size based on the delay information transmitted from the orchestrator 70, and secure the buffer 14 in the size (steps S59 and S60). For example, the transmission devices 20A and 20B compute a value twice or more the product of the transmission delay and the transmission capacity as a buffer size.

After receiving the ACK from all of the transmission devices 20, the orchestrator 70 notifies the local 30 as the request source of the ACK indicating the setting completion notification of the optical path (step S61). After receiving the ACK from the orchestrator 70, the local 30 starts communication with the remote 50 via the optical path constructed on the network 9.

In the present embodiment described above, the orchestrator 70 is provided that computes or measures delay information and notifies the intermediate devices 10A and 10B of the computation or measurement result. Although in the first embodiment, the intermediate devices 10A and 10B actually transmit and receive packets to measure delay information in the present embodiment, the orchestrator 70 calculates or measures delay information when setting an optical path, and notifies the intermediate devices 10A and 10B of the delay information to establish the optical path. Thus, in the present embodiment, it is not necessary for the intermediate devices 10A and 10B to measure delay information, thereby making it possible to shorten the time required to start communication.

Further, the orchestrator 70 may read the delay information calculated or measured in advance and notify the intermediate devices 10A and 10B of the delay information. In addition, the orchestrator 70 may notify the intermediate devices 10A and 10B of a state of the network 9 periodically or when the state of the network 9 is changed.

First Modified Example of Second Embodiment

Figure 14:
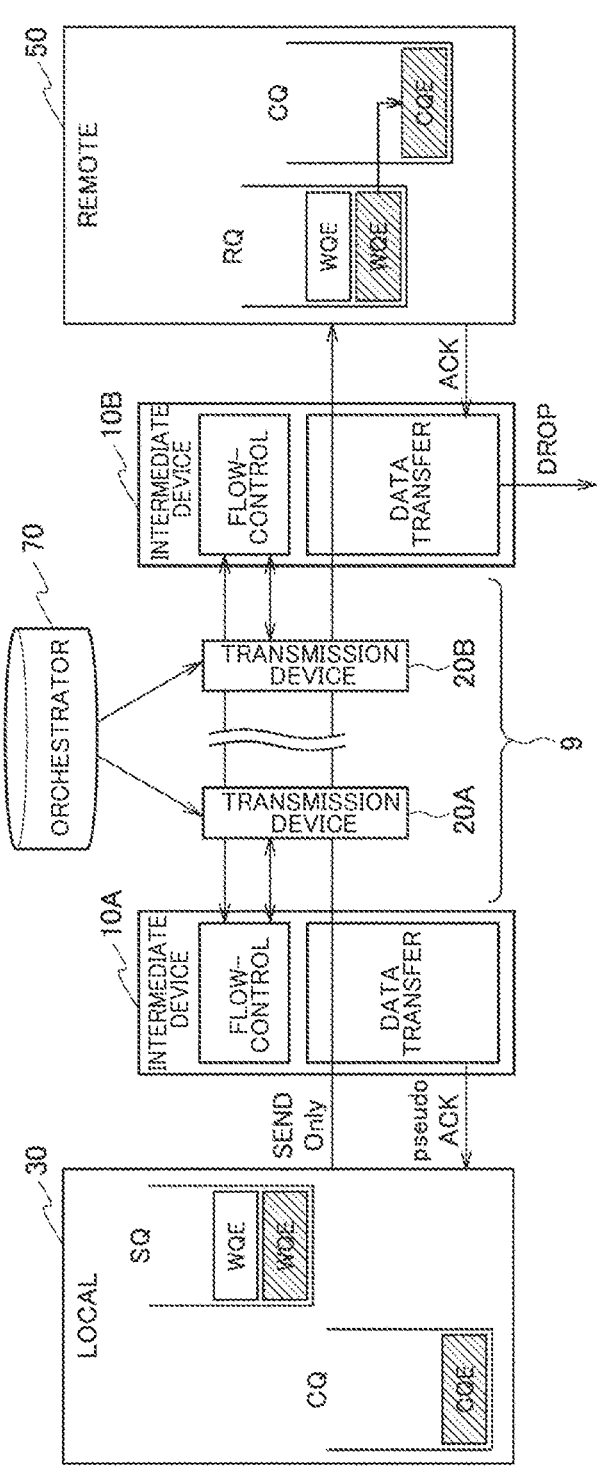
FIG. 14 is a diagram illustrating an example of a configuration of a communication system of a first modified example of the second embodiment.

FIG. 14 is a diagram illustrating a configuration of a first modified example of the second embodiment. Although the intermediate devices 10A and 10B acquire the delay information of the optical path from the orchestrator 70 in the second embodiment, the intermediate devices 10A and 10B acquire delay information of an optical path from the transmission devices 20A and 20B in a first modified example. In this case, the orchestrator 70 may notify the transmission devices 20A and 20B of the computed delay information in steps S53 and S54 of FIG. 13.

Second Modified Example of Second Embodiment

In the first modified example, the transmission devices 20A and 20B notify the intermediate devices 10A and 10B of the delay information of the optical path acquired from the orchestrator 70. In a second modified example, the transmission devices 20A and 20B measure delay information of an optical path set by the orchestrator 70 and notify the intermediate devices 10A and 10B of the measurement result. A configuration of this modified example is similar to that of the first modified example illustrated in FIG. 14.

Figure 15:
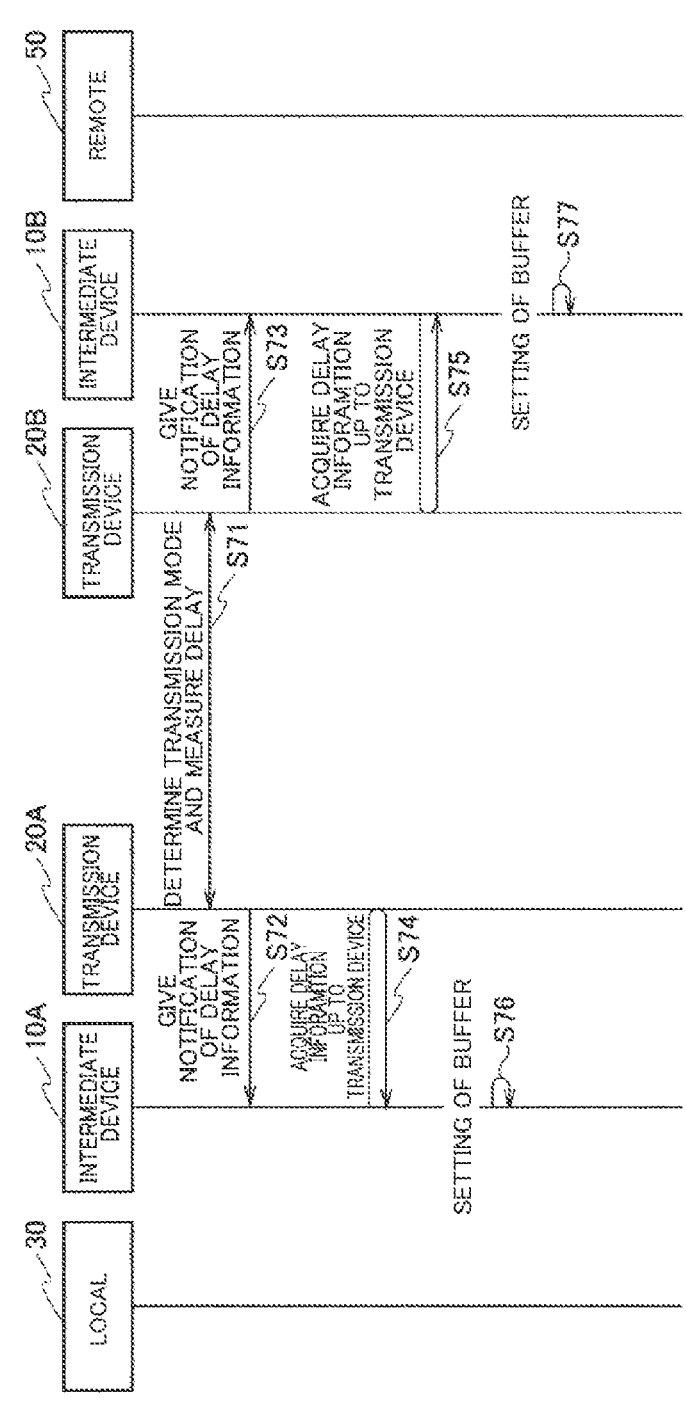
FIG. 15 is the sequence diagram illustrating an example of the flow of processing of a communication system of a second modified example of the second embodiment.

FIG. 15 is a sequence diagram illustrating an operation of a communication system of the second modified example. When the transmission device 20A receives a request from the local 30 (or the intermediate device 10A), the transmission device 20A determines a transmission mode of an optical path set between the local 30 and the remote 50 in cooperation with the transmission device 20B, and measures delay information (step S71). The transmission devices 20A and 20B transmit the measured delay information to the intermediate devices 10A and 10B (steps S72, S73).

The intermediate device 10A measures delay information up to the transmission device 20A, and the intermediate device 10B measures delay information up to the transmission device 20B (steps S74 and S75).

The intermediate device 10A computes a buffer size based on the delay information of step S71 and the delay information of step S74, and secures the buffer 14 in the size (step S76). Likewise, the intermediate device 10B computes a buffer size based on the delay information of step S71 and the delay information of step S75, and secures the buffer 14 in the size (step S77).

Further, in general, the distance from the intermediate devices 10A and 10B to the transmission devices 20A and 20B is relatively short, and the distance between the transmission devices 20A and 20B is relatively long. For this reason, most of the transmission delay is caused by the delay between the transmission devices 20A and 20B. Thus, the intermediate devices 10A and 10B may compute a buffer size based on delay information of the delay between the transmission devices 20A and 20B, and secure the buffer 14 in the size, without performing steps S74 and S75.

Third Modified Example of Second Embodiment

Figure 16:
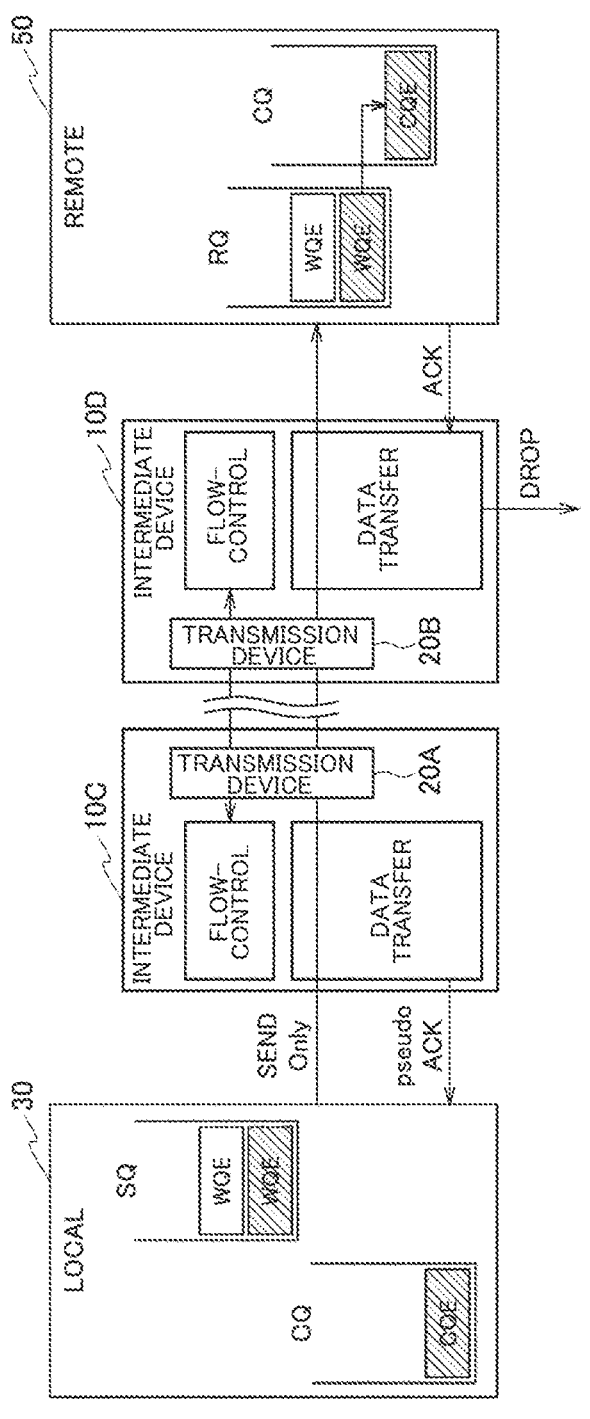
FIG. 16 is a diagram illustrating an example of a configuration of a communication system of a third modified example of the second embodiment.

FIG. 16 is a diagram illustrating a configuration of a third modified example of the second embodiment. In the third modified example, intermediate devices have functions of transmission devices. Specifically, an intermediate device 10C is a device created by causing the intermediate device 10A of the second embodiment to have the functions of the transmission device 20A, and an intermediate device 10D is a device created by causing the intermediate device 10B of the second embodiment to have the functions of the transmission device 20B.

In the present modified example, after the orchestrator 70 sets an optical path, using the functions of the transmission devices 20A and 20B implemented in the intermediate devices 10C and 10D delay information is measured when a transceiver (transponder) selects a wavelength. The intermediate devices 10C and 10D determine buffer sizes based on the measured delay information.

4. Third Embodiment

When a delay and a transmission capacity are not large or when required communication requirements (SLA) are not strict, performance can be maintained in some cases without the intermediate devices 10A and 10B by increasing a value of a queue depth of the temporary data storage unit 34 of the local 30 and the remote 50. Thus, the local 30 may request the orchestrator 70 to provide an optical path in conformity with the communication requirements, and adjust the queue depth of the local 30 from delay information of the optical path acquired from the orchestrator 70. Therefore, performance deterioration caused by an increase in a transmission delay or a transmission capacity can be avoided by adjusting the queue depth without going through the intermediate devices 10A and 10B.

However, the local 30 and the remote 50 cannot increase a queue size without limitation due to restrictions such as hardware and protocol. Then, the local 30 of the present embodiment performs communication via the intermediate devices 10A and 10B by using the communication requirements of applications and delay information acquired from the orchestrator 70, or determines whether to adjust the queue depth.

Figure 17:
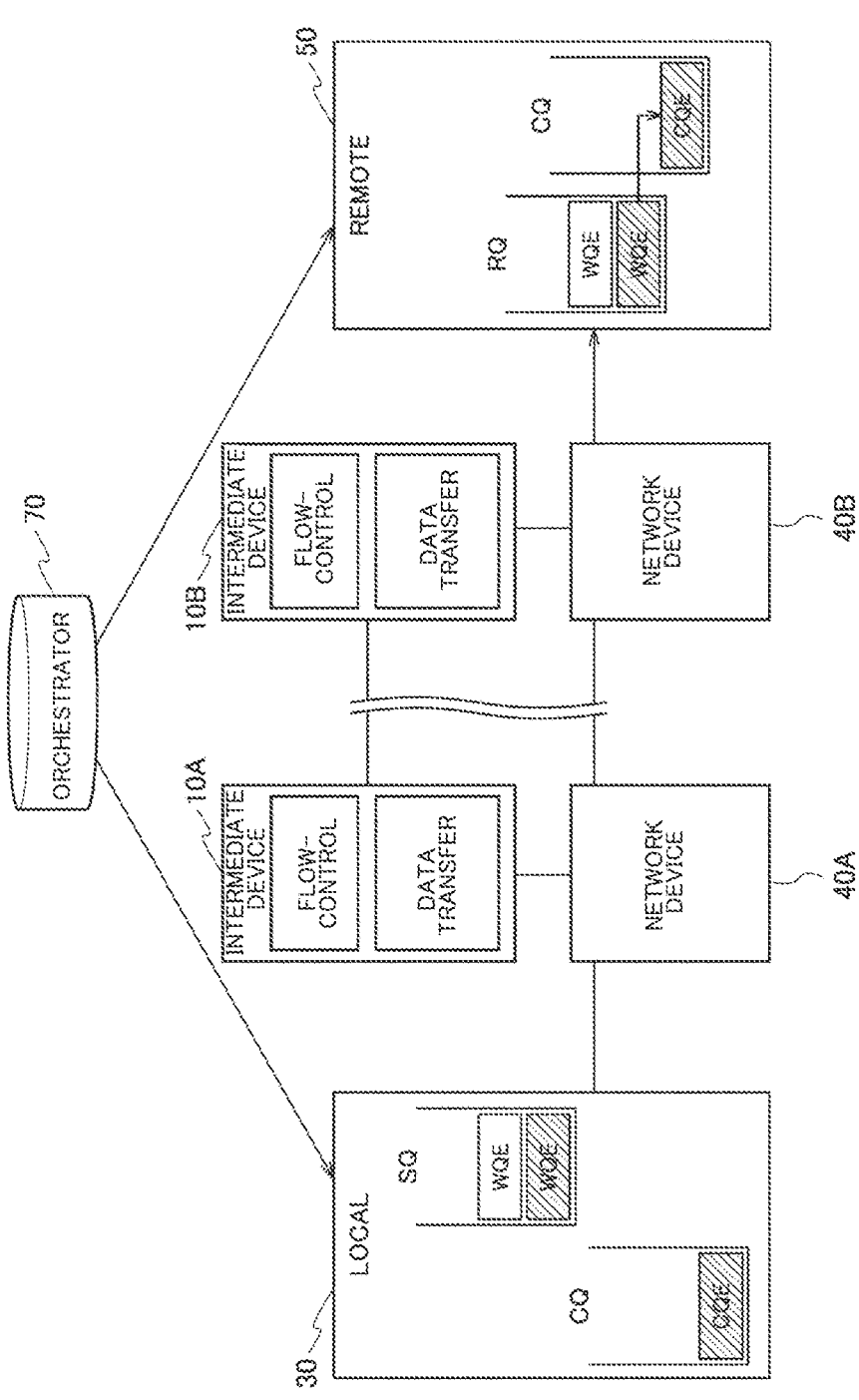
FIG. 17 is a diagram illustrating an example of a configuration of a communication system of a third embodiment.

FIG. 17 is a diagram illustrating an example of a communication system of a third embodiment. The system of the present embodiment includes a local 30, a remote 50, intermediate devices 10A and 10B, an orchestrator 70, and network devices 40A and 40B. The intermediate devices 10A and 10B and the orchestrator 70 of the present embodiment are similar to the intermediate devices 10A and 10B and the orchestrator 70 of the second embodiment.

The local 30 and the remote 50 are similar to the local 30 and the remote 50 of the first embodiment. However, a determination unit 35 of the local 30 of the present embodiment determines whether to perform communication via the intermediate device 10A and the intermediate device 10B based on delay information. For example, when a value twice or more the product of a transmission delay and a transmission capacity of delay information can be secured as a queue size of the temporary data storage unit 34, the determination unit 35 determines to perform communication without going through the intermediate device 10A and the intermediate device 10B. In this case, a queue management unit 32 of the local 30 determines a queue size and a queue depth of the temporary data storage unit 34 based on the delay information. The queue depth is determined based on the queue size and a packet size.

Similarly, the determination unit 35 of the remote 50 also determines whether to perform communication going through the intermediate device 10A and the intermediate device 10B based on the delay information, and if communication is to be performed without going through the intermediate device 10A and the intermediate device 10B, the queue management unit 32 determines a queue size and a queue depth of the temporary data storage unit 34 based on the delay information.

The network device 40A routes a request transmitted by the local 30 according to the instruction of the local 30. Specifically, the network device 40A determines whether the transfer destination of the request is to be set to the intermediate device 10A or the network device 40B by using a routing table or the like based on destination information of the request.

Similarly, the network device 40B determines whether the transfer destination of a response to the request is to be set to the intermediate device 10B or the network device 40A according to an instruction of the remote 50.

Figure 18:
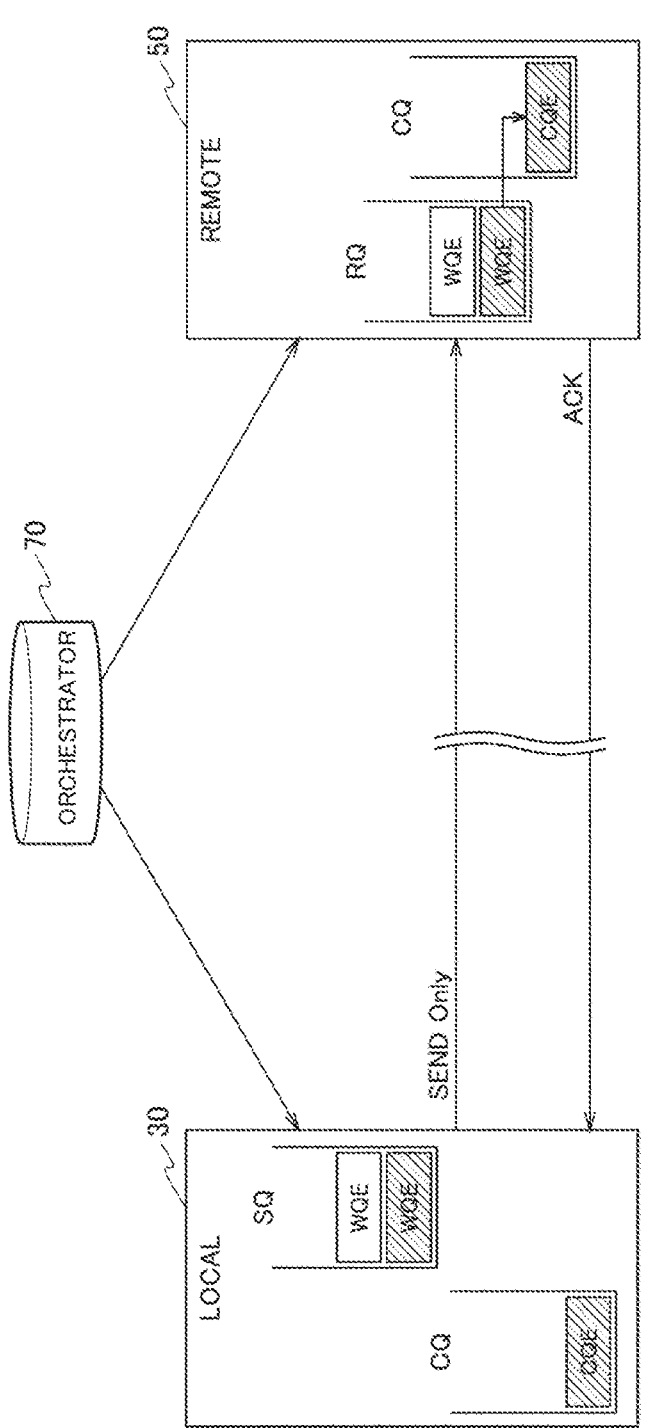
FIG. 18 is a diagram illustrating an example of a configuration of a communication system in which communication is performed without going through an intermediate device of the third embodiment.

FIG. 18 is a diagram illustrating a configuration of a communication system in which communication is performed without going through the intermediate devices 10A and 10B. The local 30 and the remote 50 determine that communication will be performed without going through the intermediate devices 10A and 10B based on delay information acquired from the orchestrator 70, and adjust the queue depth based on delay information. Then, the local 30 transmits a request to the remote 50 via the network device 40A that is not illustrated. The remote 50 transmits a response to the local 30 via the network device 40B that is not illustrated.

Figure 19:
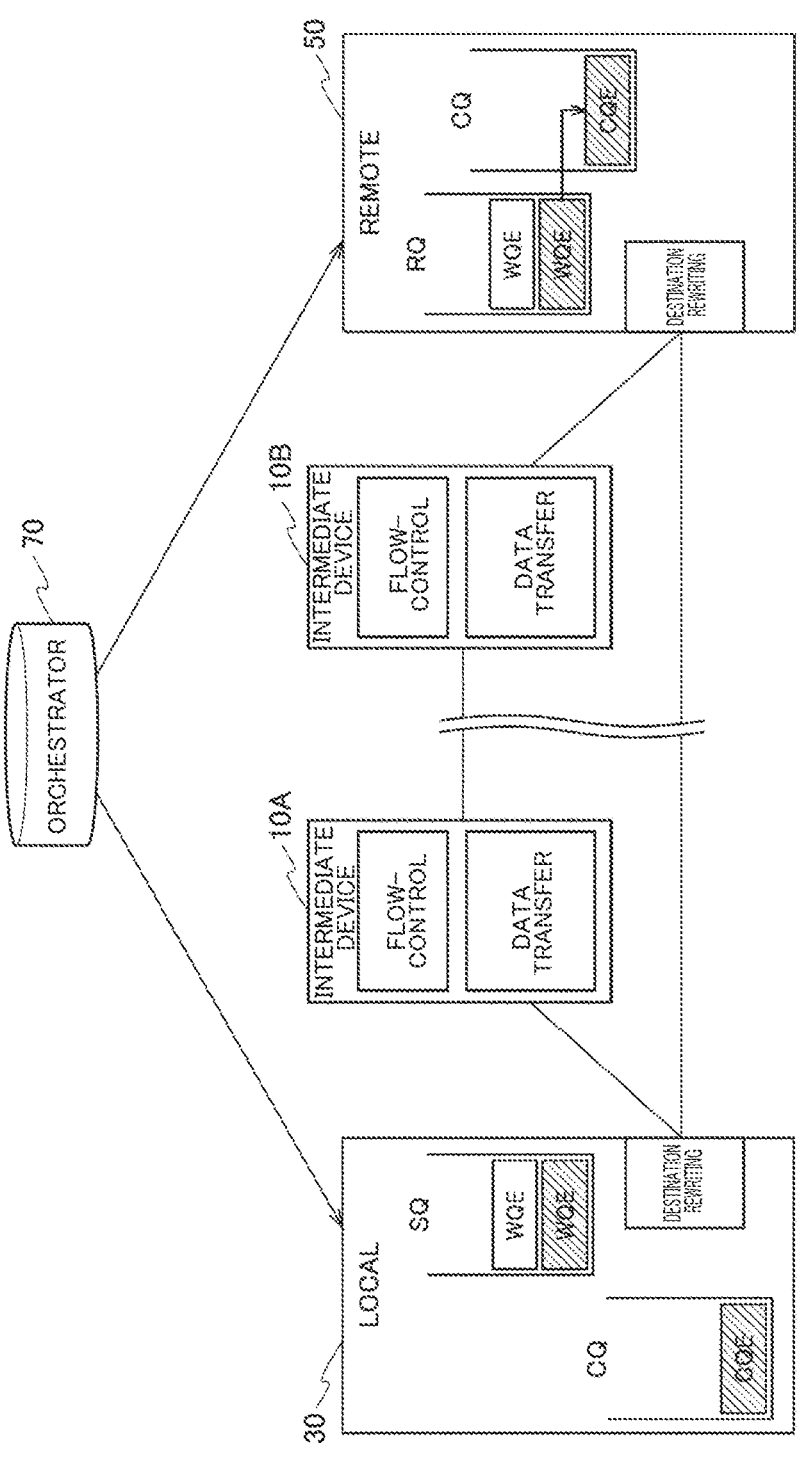
FIG. 19 is a diagram illustrating an example of a configuration of another communication system of the third embodiment.

Further, in the communication system of the present embodiment, the local 30 and the remote 50 may rewrite the destination of a request or a response without providing the network devices 40A and 40B as illustrated in FIG. 19. Specifically, the determination unit 35 of the local 30 and the remote 50 may control the transfer destination of a request or a response by rewriting destination information of the header.

In the present embodiment, the local 30 and the remote 50 determine whether to perform communication via the intermediate devices 10A and 10B based on delay information. Thus, the local 30 and the remote 50 autonomously select whether to go through the intermediate devices 10A and 10B or to adjust the queue depth of the local 30 and the remote 50 according to the delay information, thereby making it possible to perform high-speed communication. Therefore, even when the optical path or the communication requirements are dynamically changed, the optimum communication system can be automatically selected according to the delay information about the changed optical path or communication requirements.

Further, for example, in a case where the product of a transmission delay and a transmission capacity of delay information has a value equal to or greater than a predetermined value, the local 30 and the remote 50 automatically construct the intermediate devices 10A and 10B in high-function units of the transmission devices 20A and 20B, and perform communication via the constructed intermediate devices, and in a case where the product of a transmission delay and a transmission capacity of delay information has a value smaller than the predetermined value, the local 30 and the remote 50 may adjust the queue depth. A setting of intermediate devices 10A and 10B to be constructed in the transmission devices 20A and 20B or the transmission devices 20A and 20B to construct the intermediate devices 10A and 10B may be designated on the terminal side of the local 30 and the remote 50, or may be judged and determined by the orchestrator 70 based on situations such as the distance from the terminal, the route of the optical path, and congestion of the line.

Furthermore, the local 30 and the remote 50 may acquire a communication request or a change in the optical path from the orchestrator, may monitor them by using the application unit 31, or may monitor a delay by using ping or the like by means of another application to determine whether to go through the intermediate devices 10A and 10B.

5. Hardware Configuration

Figure 20:
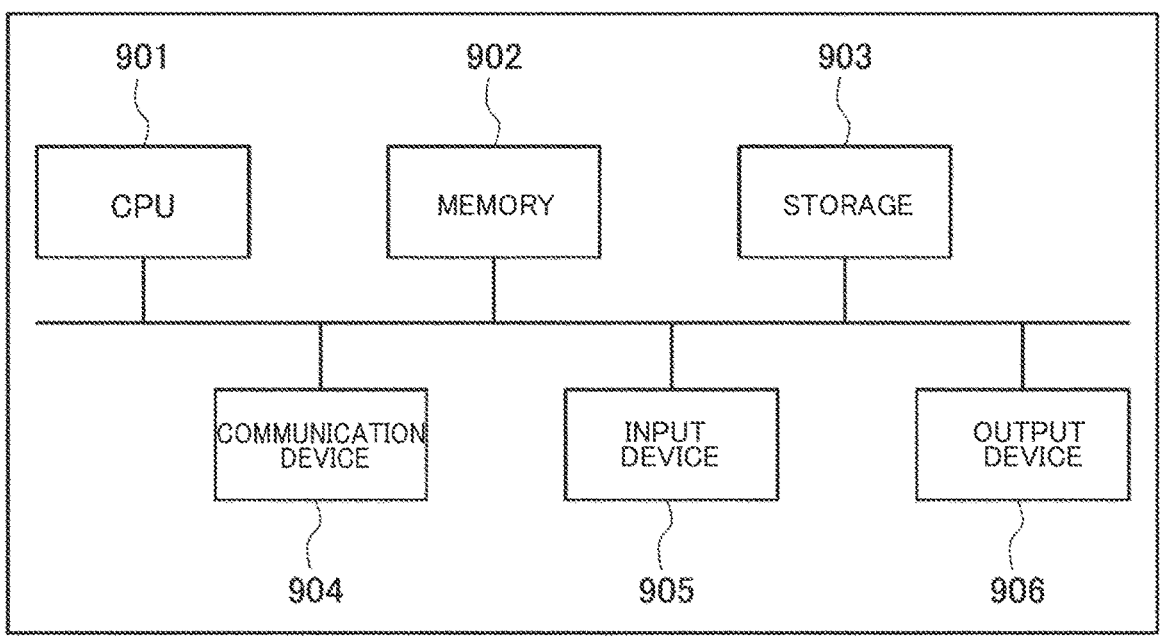
FIG. 20 An example of a hardware configuration is illustrated.

For each of the above-described local 30, remote 50, intermediate devices 10A and 10B, transmission devices 20A and 20B, and orchestrator 70, for example, a general-purpose computer system as illustrated in FIG. 20 can be used. The illustrated computer system includes a central processing unit (CPU: processor) 901, a memory 902, a storage 903 (a hard disk drive (HDD) and a solid state drive (SSD)), a communication device 904, an input device 905, and an output device 906. The memory 902 and the storage 903 are storage devices. In this computer system, the functions of each of the local 30, the remote 50, the intermediate devices 10A and 10B, the transmission devices 20A and 20B, and the orchestrator 70, are realized by having the CPU 901 execute a predetermined program loaded to the memory 902.

Furthermore, these devices may be implemented by one computer or may be implemented by a plurality of computers. Furthermore, these devices may be a virtual machine implemented by a computer. Programs for these devices can be stored in a computer-readable recording medium such as an HDD, an SSD, a universal serial bus (USB) memory, a compact disc (CD), and a digital versatile disc (DVD) or can be distributed over a network.

Further, the present invention is not limited to the above embodiments, and numerous modifications can be made within the scope and gist of the invention. For example, the intermediate devices 10A and 10B and/or the transmission devices 20A and 20B of the above embodiments may be implemented as the NIC of or an application of the local 30 or the remote 50.

In addition, the local 30 and the remote 50 may measure the distance to the intermediate devices 10A and 10B and set the queue depth of the temporary data storage unit according to the distance.

Furthermore, in the present invention, at least two of the first to third embodiments may be combined.

REFERENCE SIGNS LIST

10A, 10B, 10C, 10D Intermediate device
11 Transfer unit
12A Generation unit
12B Discarding unit
13 Network state measurement unit
14 Buffer
15 Buffer management unit
16 Credit management unit

17 Communication unit
20A, 20B Transmission device
30 Local 30
31 Application unit
32 Queue management unit
33 Network state management unit
34 Temporary data storage unit
35 Determination unit
36 Packet distribution unit 36
37 Communication unit
40A, 40B Network device
50 Remote
70 Orchestrator

The invention claimed is:

1. A communication system comprising:
a first intermediate device; and
a second intermediate device, wherein
the first intermediate device and the second intermediate device are arranged between a first device and a second device for transferring data using Remote Direct Memory Access,
the first intermediate device includes
a buffer management unit configured to determine a buffer size based on delay information about a delay of a network between the first intermediate device and the second intermediate device, and secure a buffer in the buffer size,
a transfer unit configured, when data to be transferred from the first device to the second device is smaller than a credit of the second intermediate device, to transfer a request including the data to the second intermediate device, and
a generation unit configured to generate a pseudo-response to the request and return the pseudo-response to the first device, and
the second intermediate device includes
a buffer management unit configured to determine a buffer size based on the delay information and secure a buffer in the buffer size,
a transfer unit configured to transfer the request to the second device and store the request in the buffer to update the credit of the own device, and
a discarding unit configured to discard a response received from the second device with respect to the request, delete the request stored in the buffer, and update the credit.

2. The communication system according to claim 1, wherein
each of the first intermediate device and the second intermediate device includes a network state measurement unit configured to measure the delay information.

3. The communication system according to claim 1, comprising
an orchestrator configured to calculate or measure the delay information and notify the first intermediate device and the second intermediate device of the delay information.

4. The communication system according to claim 1, wherein
the buffer management unit of the first intermediate device acquires the delay information from a first transmission device arranged on the network, and
the buffer management unit of the second intermediate device acquires the delay information from a second transmission device arranged on the network.

5. The communication system according to claim 1, comprising:

the first device; and the second device, wherein each of the first device and the second device includes a determination unit configured to determine whether to perform communication via the first intermediate device and the second intermediate device based on the delay information, and a queue management unit configured to determine a queue depth of an own device based on the delay information when communication is performed without going through the first intermediate device and the second intermediate device.

6. A non-transitory computer-readable storage medium storing a program causing a computer to function as an intermediate device arranged between a first device and a second device for transferring data using Remote Direct Memory Access, the intermediate device comprising:

buffer management instructions configured to determine a buffer size based on delay information about a network between the intermediate device and another intermediate device as a transfer destination, and secure a buffer in the buffer size;

transfer instructions configured, when data to be transferred from the first device to the second device is smaller than a credit of the intermediate device as the transfer destination, to transfer a request including the data to the intermediate device as the transfer destination; and generation instructions configured to generate a pseudo-response to the request and return the pseudo-response to the first device.

7. A communication method performed by a communication system including a first intermediate device and a second intermediate device, wherein the first intermediate device and the second intermediate device are arranged between a first device and a second device for transferring data using Remote Direct Memory Access, the first intermediate device performs:

determining a buffer size based on delay information about a delay of a network between the first intermediate device and the second intermediate device, and securing a buffer in the buffer size;

when data to be transferred from the first device to the second device is smaller than a credit of the second intermediate device, transferring a request including the data to the second intermediate device; and generating a pseudo-response to the request and returning the pseudo-response to the first device, and the second intermediate device performs:

determining a buffer size based on the delay information and securing of a buffer in the buffer size;

transferring the request to the second device and storing the request in the buffer to update the credit of the own device; and discarding a response received from the second device with respect to the request, deleting the request stored in the buffer, and updating the credit.

\* \* \* \* \*